(12) United States Patent
Taguchi et al.

(10) Patent No.: US 8,332,673 B2
(45) Date of Patent: Dec. 11, 2012

(54) SYSTEM AND METHOD TO MANAGE POWER CONSUMPTION

(75) Inventors: Yuichi Taguchi, Sagamihara (JP); Shinichi Hayashi, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 380 days.

(21) Appl. No.: 12/664,575

(22) PCT Filed: Aug. 4, 2009

(86) PCT No.: PCT/JP2009/003719
§ 371 (c)(1),
(2), (4) Date: Dec. 14, 2009

(87) PCT Pub. No.: WO2011/016081
PCT Pub. Date: Feb. 10, 2011

(65) Prior Publication Data
US 2011/0208911 A1    Aug. 25, 2011

(51) Int. Cl.
*G06F 1/26* (2006.01)
*G06F 1/32* (2006.01)
(52) U.S. Cl. ................................ 713/320
(58) Field of Classification Search .......... 713/300
See application file for complete search history.

(56) References Cited

U.S. PATENT DOCUMENTS

| 7,340,325 B2 * | 3/2008 | Sousa et al. ............ 700/295 |
| 7,444,483 B2 | 10/2008 | Taguchi et al. |
| 2007/0061512 A1 | 3/2007 | Taguchi et al. |
| 2008/0215901 A1 * | 9/2008 | Beard ..................... 713/300 |
| 2008/0232530 A1 * | 9/2008 | Carballo et al. ........ 375/371 |

FOREIGN PATENT DOCUMENTS

| EP | 1 770 497 A2 | 4/2007 |
| JP | 2007-079754 A | 3/2007 |

* cited by examiner

*Primary Examiner* — Mohammed Rehman
(74) *Attorney, Agent, or Firm* — Foley & Lardner LLP

(57) ABSTRACT

This invention manages a power consumption of a system including a computer and a storage in combination with a workload of a business application. More specifically, a power consumption per transaction processing count is employed as an index that an application user utilizes as a guide for adjusting a power consumption amount. Further, the invention provides means that adjusts a power consumption per workload based on a trade off between power consumption and system performance. When adjusting the power consumption, the system configuration is modified so as to increase or decrease computer resources such as a disk or a server that the application utilizes.

12 Claims, 24 Drawing Sheets

| RAID GROUP IDENTIFICATION INFORMATION | DISK DRIVE IDENTIFICATION INFORMATION | | | |
|---|---|---|---|---|
| | #1 | #2 | #3 | #4 |
| RG#01 | HD#01 | HD#02 | HD#03 | HD#04 |
| RG#02 | HD#11 | HD#12 | HD#13 | HD#14 |
| ... | ... | ... | ... | ... |

| LOGICAL STORAGE AREA IDENTIFICATION INFORMATION | RAID GROUP IDENTIFICATION INFORMATION | ADDRESS RANGE | |
|---|---|---|---|
| | | START BLOCK ADDRESS | END BLOCK ADDRESS |
| LD#01 | RG#01 | 0x0001 | 0x0100 |
| LD#02 | RG#01 | 0x0101 | 0x0200 |
| LD#03 | RG#02 | 0x0001 | 0x0100 |
| ... | ... | ... | ... |

| WORLD WIDE PORT NAME | LOGICAL UNIT NUMBER | LOGICAL STORAGE AREA IDENTIFICATION INFORMATION |
|---|---|---|
| 50:00:00:01:1E:0A:F4:01 | LU#01 | LD#01 |
| 50:00:00:01:1E:0A:F4:01 | LU#02 | LD#02 |
| 50:00:00:01:1E:0A:F4:02 | LU#01 | LD#03 |
| 50:00:00:01:1E:0A:F4:02 | LU#02 | LD#01 |
| ... | ... | ... |

| TIME | BUSY RATE [%] | IO RATE [IO/sec] | DATA TRANSFER RATE [MB/sec] |
|---|---|---|---|
| 01/01/2009  0:00 | 5 | 10 | 24 |
| 01/01/2009  0:15 | 1 | 1 | 2 |
| 01/01/2009  0:30 | 40 | 96 | 49 |
| ... | ... | ... | ... |

| TIME | POWER CONSUMPTION [VA] |
|---|---|
| 01/01/2009 0:00 | 50 |
| 01/01/2009 0:15 | 55 |
| 01/01/2009 0:30 | 48 |
| ... | ... |

| MOUNT POINT | TARGET WORLD WIDE PORT NAME | LOGICAL UNIT NUMBER |
|---|---|---|
| /mount/data1 | 50:00:00:01:1E:0A:F4:01 | LU#01 |
| /mount/data2 | 50:00:00:01:1E:0A:F4:01 | LU#02 |
| /mount/data3 | 50:00:00:01:1E:0A:F4:02 | LU#01 |
| ... | ... | ... |

| TIME | CPU BUSY RATE [%] | TRANSACTION COUNT | E-MAIL MESSAGE COUNT |
|---|---|---|---|
| 01/01/2009  0:00 | 5 | 10 | 24 |
| 01/01/2009  0:15 | 1 | 1 | 2 |
| 01/01/2009  0:30 | 40 | 96 | 49 |
| ... | ... | ... | ... |

| BUSINESS APPLICATION INSTANCE | STATUS | STORAGE CONFIGURATION |
|---|---|---|
| AP#01 | Running | /mount/data1 |
| AP#02 | Shutdown | /mount/data2 |
| AP#03 | Sleep (Suspend) | /mount/data3 |
| ... | ... | ... |

| Num of RAID Group | Power Consumption [kVA] | Performance [IOPS] |
|---|---|---|
| 10 | 600 | 1000 |
| 9 | 580 | 900 |
| 8 | 530 | 800 |
| 7 | 450 | 700 |
| ... | ... | ... |

| Disk number | Idling power [w] | Random read time power increment [w] | Random write time power increment [w] | Sequential read time power increment [w] | Sequential write time power increment [w] |
|---|---|---|---|---|---|
| #0 | 14.1 | 4.9 | 1.9 | 1.6 | 1.9 |
| #1 | 8.9 | 5.1 | 2.3 | 2.0 | 2.3 |
| #2 | 11.4 | 5.6 | 2.4 | 1.8 | 2.3 |
| ... | ... | ... | ... | ... | ... |

Columns: 321, 322, 323, 324, 325, 326. Table 32.

FIG. 25

| Disk number | Random read total operating time [microseconds] | Random write total operating time [microseconds] | Sequential read total operating time [microseconds] | Sequential write total operating time [microseconds] |
|---|---|---|---|---|
| #0 | 82,148 | 8,651 | 32,823 | 6,647 |
| #1 | 9,384 | 46,095 | 5,020 | 107 |
| ... | ... | ... | ... | ... |

Columns: 331, 332, 333, 334, 335. Table 33.

| Disk number | Tag number | Access classification |
|---|---|---|
| #0 | 0 | Random read |
| | 1 | Random read |
| | 2 | None |
| | ... | ... |
| #1 | 0 | Sequential read |
| | 1 | Sequential read |
| ... | ... | ... |

$$P_{static} = P_{idle}$$
$$P_{RndRd} = AR_{RndRd} \times P_{RndRd}$$
$$P_{RndWr} = AR_{RndWr} \times P_{RndWr}$$
$$P_{SeqRd} = AR_{SeqRd} \times P_{SeqRd}$$
$$P_{SeqWr} = AR_{SeqWr} \times P_{SeqWr}$$
$$P_{dynamic} = P_{RndRd} + P_{RndWr} + P_{SeqRd} + P_{SeqWr}$$

$P_{idle}$ : Idling power 322 in disk power specifications table 32

$P_{RndRd}$ : Random read time power increment 323 in disk power specifications table 32

$P_{RndWr}$ : Random write time power increment 324 in disk power specifications table 32

$P_{SeqRd}$ : Sequential read time power increment 325 in disk power specifications table 32

$P_{SeqWr}$ : Sequential write time power increment 326 in disk power specifications table 32

$AR_{RndRd}$: Busy rate of random read access $AR_{RndWr}$: Busy rate of random write access $AR_{SeqRd}$: Busy rate of sequential read access $AR_{SeqWr}$: Busy rate of sequential write access $P_{static}$ : Hard disk power in static state $P_{dynamic}$ : Hard disk power increment produced by access $P_{RndRd}$ : Hard disk power increment produced by random read $P_{RndWr}$ : Hard disk power increment produced by random write $P_{SeqRd}$ : Hard disk power increment produced by sequential read $P_{SeqWr}$ : Hard disk power increment produced by sequential write

SYSTEM AND METHOD TO MANAGE POWER CONSUMPTION

TECHNICAL FIELD

The present invention relates to a storage system, a control method thereof, and a program, and for example relates to technology for managing power consumption for an application.

BACKGROUND ART (1) Storage Area Network

A network that connects one or more computers and one or more external storage apparatuses is called a "storage area network (SAN)". A storage area network is a computer system that is used especially frequently in a case where multiple computers cooperate to provide a single function or when multiple computers share one large capacity storage device. A storage area network facilitates easier subsequent addition, elimination, or replacement of storage resources or computer resources, and has the advantage of having excellent extensibility.

(2) Disk Array Apparatus

Generally, a disk array apparatus is frequently utilized for an external storage apparatus that is connected to a SAN. A disk array apparatus is an apparatus in which a large number of magnetic storage devices typified by a hard disk are mounted.

The disk array apparatus manages multiple magnetic storage devices as a single group using RAID (Redundant Array of Independent Disks) technology. A group of magnetic storage devices is called a "RAID group". A RAID group forms one or more logical storage areas. A computer that is connected to a SAN executes data input/output processing with respect to the storage area. When recording data in the storage area, the disk array apparatus records one or two pieces of redundant data among the magnetic storage devices constituting the RAID group. Because of the existence of the redundant data, there is the advantage that even in a situation in which one of the magnetic storage devices breaks down, it is possible to restore the data from the remaining magnetic storage devices within the RAID group.

(3) Power Consumption Management Method

Patent Citation 1 discloses technology that manages power that a storage system consumes. According to this technology, it is possible to compute the power consumption by a calculation that takes a workload (number of I/Os, transfer data amount) produced by storage processing as a variable, and output the result to a management screen. At such time, the technology does not simply output the power consumption, but outputs the power consumption in combination with the workload (IOPS, MB/sec).

Further, when a workload exceeds a predetermined threshold value, the technology can concentrate a storage area into one portion of the magnetic storage devices, and save power consumption by stopping magnetic storage devices that have become empty.

(4) Utility Service

Service providers such as Saas or Paas provide a service that lends out storage capacity to clients via a network. Clients can make practical use of storage resources across a network.

CITATION LIST

Patent Literature

PTL 1: JP Patent Publication (Kokai) No. 2007-79754 A (corresponds to U.S. Pat. No. 7,444,483 specification)

SUMMARY OF INVENTION

Technical Problem

The aforementioned Patent Citation 1 discloses a method that outputs a transition in the power consumption of a disk array apparatus in combination with a storage workload (data transfer amount). This is a power management method that is extremely useful for an administrator who is familiar with storage technology.

However, according to this method, a storage management index (IOPS, MB/sec) is not necessarily an index that is easy to manage for a server administrator or application administrator. Normally, a server administrator or an application administrator is not familiar with storage technology. Hence, a problem may arise whereby the administrator is unable to interpret trends or indications in power consumption transitions directly from a storage management index, or is unable to judge whether efficiency is good or bad, or even when the administrator attempts improvements the administrator finds it difficult to consider what to adjust and to what degree to perform the adjustment.

For example, for a database administrator, it is easier to handle a management item such as the transaction count that a DBMS (Data Base Management System) processes. However, since a processing unit that is managed on the storage side is the number of IOs (IOPS) or a data transfer amount (MB/sec), an observation result or report regarding these units is difficult to interpret for the database administrator. Similarly, a mail server administrator is familiar with working with an index such as an e-mail message count in order to manage the operating performance of an application. However, it is not necessarily the case that a mail server administrator is familiar with an index such as the number of IOs or a data transfer amount.

Further, on the storage side, since I/Os from a plurality of applications or servers are counted together, a case can be supposed in which it is not possible to ascertain statistics for a specific server or for each application.

As described above, there is the problem that it is difficult for a server administrator or an application administrator to manage power conservation using only a storage management index. In particular, for a server administrator who makes practical use of storage in the form of a utility service, a form is desirable in which service charges are determined not on a simple capacity basis as in the current situation, but on a utilization amount (workload) basis. It is desirable that a server administrator prepares operation means so as to lower the server administrator's own service charges by performing control so as to reduce power consumption in a storage area with respect to the utilization amount is small.

Further, the power consumption of a data center (for example, corresponds to the entire system shown in FIG. 1) increases accompanying an increase in the scale of the system. There is an upper limit to the power supply equipment of a data center, and a power supply that exceeds the upper limit is not possible. However, based on this premise, a problem will not occur as long as there is always enough power supply equipment to achieve a power supply that is greater than the maximum power consumption of the system.

However, in reality, since servers are augmented and storage capacity is increased, it is not always the case that sufficient power source equipment is available, and cases can be supposed in which the amount of power being supplied is insufficient. In such a case in which the power supply is insufficient, measures such as stopping applications with low priority are required in order to keep damage to a minimum.

The present invention has been made in view of these circumstances, and an object of the invention is to provide technology that allows even an administrator with a poor knowledge regarding storage to easily manage power consumption, and enables system operations that can also support utility services.

Solution to Problem

To solve the above problems, the present invention provides means for outputting a power consumption of a storage system (computer system) in combination with an application management index, and controlling a power consumption per application workload. In addition, the invention performs system configuration modification processing for suppressing a power consumption to a fixed amount or below.

That is, a storage system according to the present invention comprises a storage apparatus (100A, 100B, ...) in which a disk apparatus (130) is mounted; a server apparatus (200A, 200B, ...) that runs an application and perform data input/output processing to and from a storage area of a disk apparatus; and a management computer (400) that manages a usage state of the storage apparatus (100A, 100B, ...) and the server apparatus (200A, 200B, ...). Here, the server apparatus (200A, 200B, ...) manages a transaction count and a temporal transition (2060) thereof for each application. Further, the management computer (400) calculates an electric power that is consumed in order to execute an application that is a management target, acquires a transaction count of the application that is the management target from the server apparatus (200A, 200B, ...), and displays a temporal transition (1901) in a power consumption and a transaction count that is calculated for the application that is the management target on a display section.

Further, the server apparatus (200A, 200B, ...) manages application configuration information (2120) that shows a storage area of a disk apparatus that an application utilizes. In this case, the management computer (400) acquires the application configuration information (2120) from the server apparatus (200A, 200B, ...), identifies a storage area of a disk apparatus that the application that is the management target utilizes based on the application configuration information (2120), and calculates an electric power that is consumed by the storage apparatus (100A, 100B, ...) in order to execute the application that is the management target based on power specification information of the disk apparatus (130) that has the identified storage area.

Furthermore, the management computer (400) calculates a storage performance that can be exerted in a case in which a configuration of a storage area of a disk apparatus that an application that is a management target utilizes is modified, and an electric power that is consumed at the storage apparatus (100A, 100B, ...) after the modification by the application that is the management target based on power specifications of a disk apparatus (130) corresponding to a configuration of the storage area after the modification, and displays a trade-off curve between the storage performance and the power consumption on the display section.

In addition, the management computer (400) displays as a user interface on the display section a parameter adjustment section (1902) for modifying an expectation value of a power consumption per transaction count for the application that is the management target.

In a case in which a user modifies an expectation value for an application that is a management target using the parameter adjustment section (1902), the management computer (400) identifies a configuration of a storage area of a disk apparatus (130) that satisfies the expectation value after the modification, and instructs the storage apparatus (100A, 100B, ...) to modify a configuration of a storage area that the application that is the management target utilizes. Based on the instruction to modify the storage area configuration, the storage apparatus (100A, 100B, ...) move the storage area that the application that is the management target utilizes among a plurality of disk apparatus. More specifically, in a case in which an expectation value is modified for a purpose of reducing a power consumption, the storage apparatus (100A, 100B, ...) stops an empty disk apparatus that is no longer used for executing the application that is the management target.

According to another aspect of the present invention, in a case in which a power consumption that is calculated for an application that is a management target exceeds a predetermined threshold value, the management computer (400) automatically modifies an expectation value of a power consumption per transaction count so as to lower the expectation value by a single level, identifies a configuration of a storage area of a disk apparatus that satisfies the expectation value after the modification, and instructs the storage apparatus (100A, 100B, ...) to modify a configuration of the storage area that the application that is the management target utilizes.

According to a further aspect, in a case in which a power consumption of an overall storage system exceeds a predetermined threshold value, the management computer (400) selects a lowest priority application as a management target, automatically modifies an expectation value of a power consumption per transaction count for the selected application that is the management target so as to lower the expectation value by a single level, identifies a configuration of a storage area of a disk apparatus that satisfies the expectation value after the modification, and instructs the storage apparatus (100A, 100B, ...) to modify a configuration of the storage area that the application that is the management target utilizes.

Further features of the present invention will become apparent from the description of the best modes for carrying out the invention and the attached drawings.

Advantageous Effects of Invention

According to the present invention, management of power consumption is easy even for an administrator with a poor knowledge regarding storage, and system operations that can also support a utility service are enabled.

BRIEF DESCRIPTION OF DRAWINGS

FIG. 8 is a view that illustrates the contents (examples) of RAD group configuration information 1020.

FIG. 9 is a view that illustrates the contents (examples) of logical storage area configuration information 1030.

FIG. 10 is a view that illustrates the contents (examples) of logical storage unit configuration information 1040.

FIG. 11 is a view that illustrates the contents (examples) of storage workload monitoring information 1060.

FIG. 12 is a view that illustrates the contents (examples) of storage power consumption information 1070.

FIG. 13 is a view that illustrates the contents (examples) of storage area management information 2030.

FIG. 14 is a view that illustrates the contents (examples) of server workload monitoring information 2060.

FIG. 15 is a view that illustrates the contents (examples) of business application configuration information 2120 in the server 200.

FIG. 22 is a view that illustrates an example of a result obtained after computing a system performance and a power consumption at a step S105.

FIG. 24 is a view that shows an example of a disk power specifications table.

FIG. 25 is a view that shows an example of a disk operation record table.

FIG. 26 is a view that illustrates an example of a tag management table 34.

FIG. 28 is a view that illustrates an example of a method of calculating a disk section power increment that the power estimation function 24 performs at S241 and S243.

DESCRIPTION OF EMBODIMENTS

Figure 1:
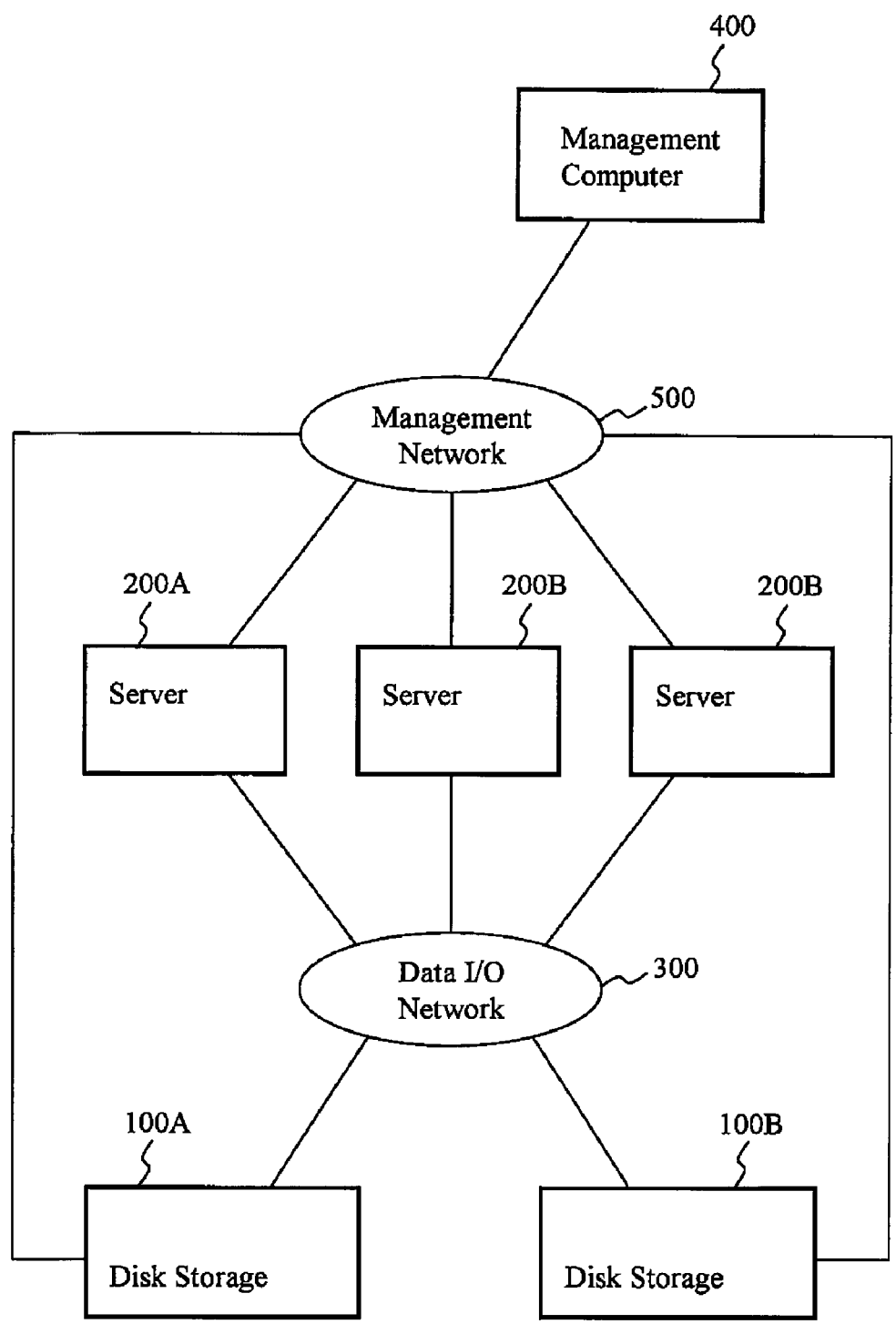
FIG. 1 is a view that shows a schematic configuration of a storage system according to the present invention.

Hereunder, modes for the present invention are described with reference to the attached drawings. It should be understood that these modes for the invention are merely examples for implementing the present invention and are not intended to limit the technical scope of the invention. Further, the same reference numerals are assigned to common components in the respective drawings.

(1) Embodiment 1

<System Configuration>

FIG. 1 is a view that illustrates an example of a schematic configuration of a storage area network (storage system) according to a first mode for the present invention. The configuration shown in FIG. 1 is the same as the configuration of other modes for the invention that are described later.

As shown in FIG. 1, a storage area network (storage system) includes servers 200 that run applications such as a database or a file server and perform data input/output with respect to storage areas, disk storages 100 (100A, 100B, ...) that are connected via a data I/O network 300 with the servers 200 (200A, 200B, ...) and in which hard disk are mounted to provide storage areas as units of areas that store data, and a management computer 400 that is connected to the servers 200 via a management network 500. Mutual input/output of data is possible between the servers 200 and the disk storages 100. Communication is possible via the respective networks between the disk storages 100, the servers 200, and the management computer 400. In this connection, although according to the present mode for the invention a configuration is adopted in which a data input/output network and a management network are shared, a configuration may also be adopted in which a data input/output network and a management network are independent networks.

<Disk Storage Configuration>

Figure 2:
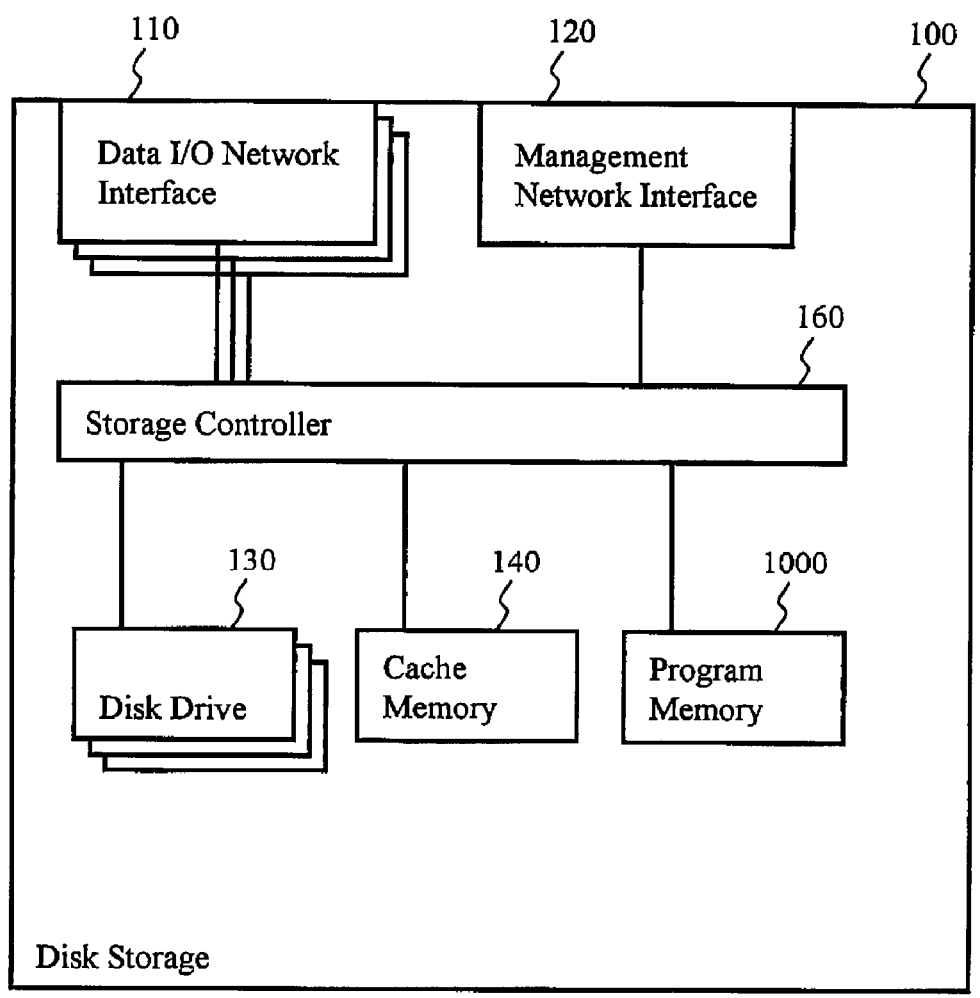
FIG. 2 is a view that shows a schematic configuration of the hardware of a disk storage 100 according to the present invention.

FIG. 2 is a view that shows a schematic configuration example (common for each mode for the invention) of the disk storage 100 according to the present invention. As shown in FIG. 2, the disk storage 100 includes a data I/O network interface 110 that is connected to the data I/O network 300 and is used for performing data input/output, a management network interface 120 that is connected to the management network 500 and is used for communicating with the management computer 400, a storage controller 160 that has a processor mounted therein that is responsible for control inside the disk storage 100, a program memory 1000 that is a storage space that stores a program that is required for operation of the disk storage 100, a cache memory 140 that is a temporary storage area for speeding up input and output with respect to a storage area to and from the server 200, and a disk drive 130 that is a magnetic storage apparatus that stores data. These components are connected to each other via the storage controller 160.

The data I/O network interface 110 and the management network interface 120 can be implemented with a network input/output apparatus that is in accordance with conventional communication technology such as a fiber channel or Ethernet (registered trademark). In this connection, according to the present invention it is not necessary to limit the number of the data I/O network interface 110 and the management network interface 120. Further, a configuration may be adopted in which the data I/O network interface 110 and the management network interface 120 are not independent, and instead the data I/O network interface 110 is shared for the purpose of input/output of management information.

The cache memory 140 is generally implemented by a volatile memory. However a configuration may also be adopted in which a non-volatile memory or a magnetic storage apparatus is substituted for the volatile memory. In the present invention, there is no limit with respect to the number of cache memories 140 or to the capacity thereof.

The program memory 1000 is a memory space that is implemented with a magnetic storage apparatus or a volatile semiconductor memory, and is utilized for the purpose of holding basic programs or information required for operation of the disk storage 100. Control programs or control information that are held by the program memory 1000 are described later (see FIG. 5).

The disk drive 130 is a storage medium that stores data, and is implemented by a magnetic storage apparatus (Hard Disk Drive: HDD) or a semiconductor memory drive (Solid State Disk: SSD). In the present invention, there is no limit with respect to the number of disk drives 130 or to the capacity thereof.

<Server Configuration>

Figure 3:
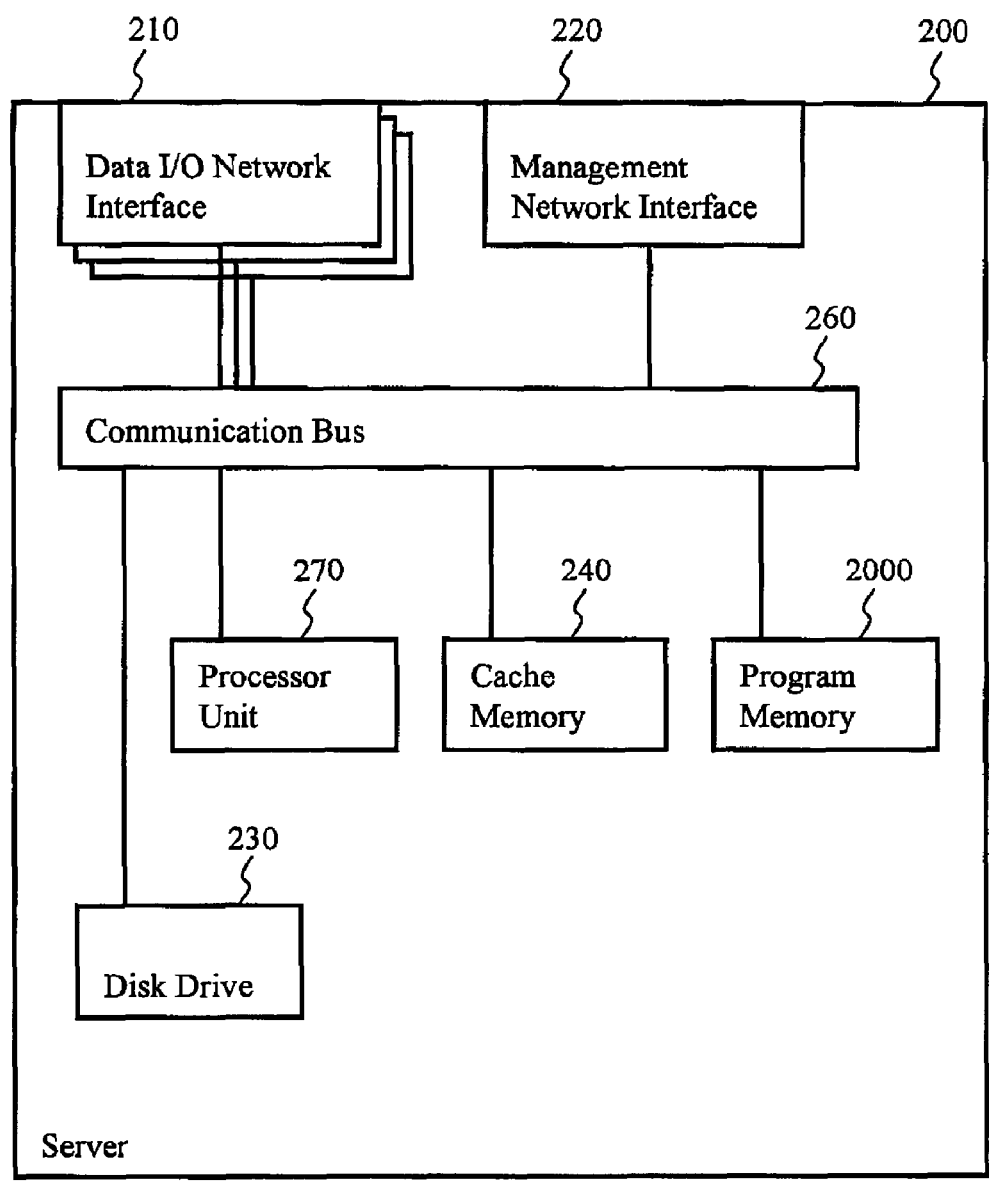
FIG. 3 is a view that shows a schematic configuration of the hardware of a server 200 according to the present invention.

FIG. 3 is a view that shows a configuration example (common for each mode for the invention) of the server 200 according to the present invention. As shown in FIG. 3, the server 200 includes a data I/O network interface 210 that is connected to the data I/O network 300 and is used for performing data input/output, a management network interface 220 that is connected to the management network 500 and is used for communicating with the management computer 400, a processor unit 270 that corresponds to a CPU that performs various kinds of processing, a disk drive 230 that is a storage apparatus for storing basic software such as an operating system and applications, a program memory 2000 that is a storage space that stores a program that is required for operation of the server 200, and a cache memory 240 that is a temporary storage area for speeding up input and out to and from a storage apparatus. These components are connected to each other via a communication bus 260. That is, the hardware configuration of the server 200 shown in this example is a configuration that can be implemented with a general purpose computer (personal computer: PC).

In this connection, implementation of the network interfaces and the cache memory 240, the program memory 2000, and the disk drive 230 are the same as in FIG. 2.

The program memory 2000 may also be used for operation of a business application program such as, for example, a database or an accountancy program, for creating and updating information that is stored in the disk storage 100. Control programs or control information that are held by the program memory 2000 are described later (see FIG. 6).

<Management Computer Configuration>

Figure 4:
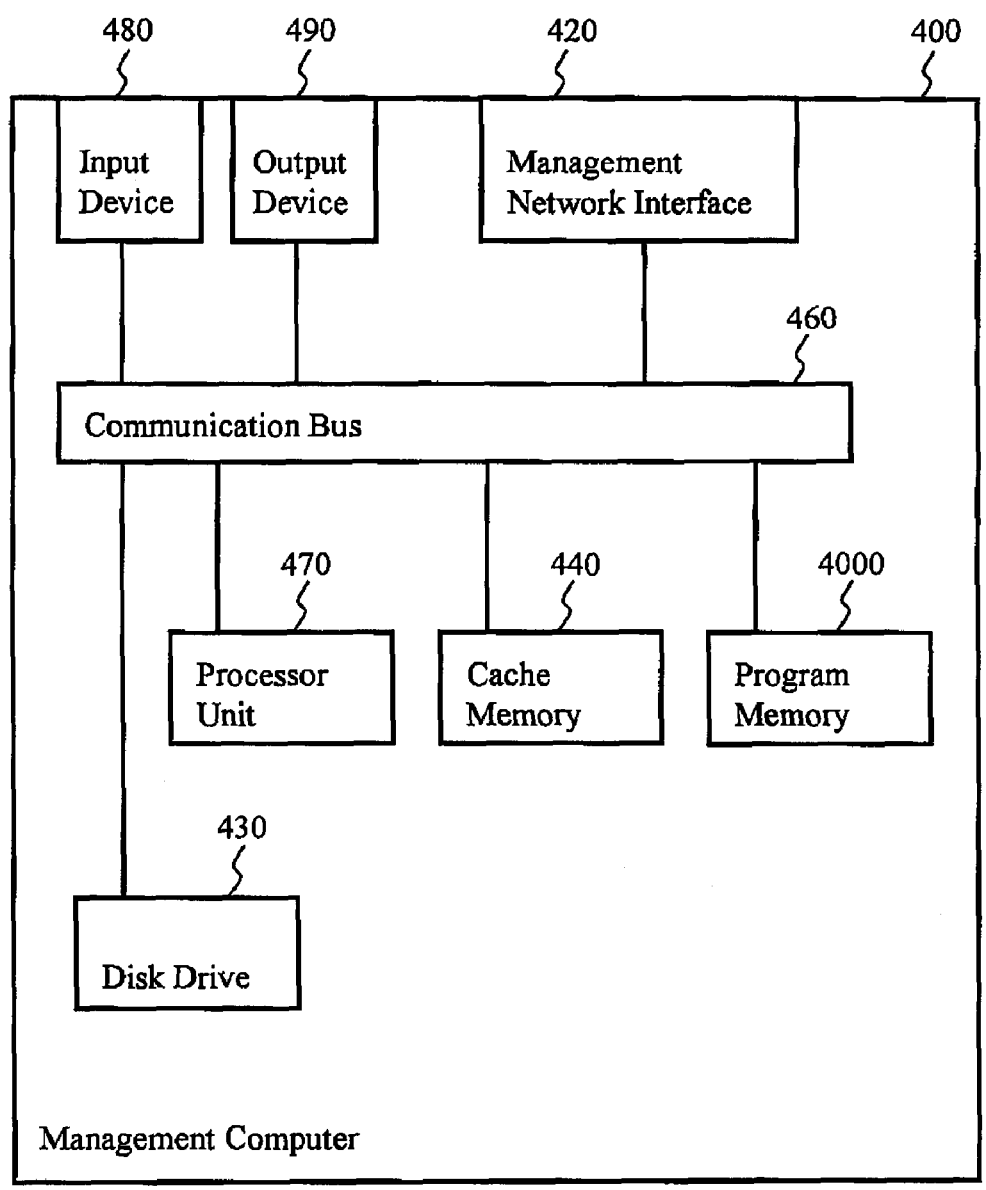
FIG. 4 is a view that shows a schematic configuration of the hardware of a management computer 400 according to the present invention.

FIG. 4 is a view that shows a schematic configuration example of the management computer 400 according to the present invention. As shown in FIG. 4, the management computer 400 includes a management network interface 420 that is connected to an external apparatus and is used for input and output of management information, an input device 480 such as, for example, a keyboard or mouse that allows an operator to input information, an output device 490 such as, for example, a general purpose display that outputs information to an operator, a processor unit 470 that corresponds to a CPU that performs various kinds of calculation processing, a disk drive 430 that is a storage apparatus for storing basic software such as an operating system and applications, and a program memory 4000 that is a storage space that stores a program that is required for operation of the management computer 400. These components are connected to each other via a communication bus 460. That is, the hardware configuration of the management computer 400 shown in this example is a configuration that can be implemented with a general purpose computer (personal computer: PC).

The program memory 4000 is a memory space that is implemented with a magnetic storage apparatus or a volatile semiconductor memory, and is utilized for the purpose of holding basic programs or information required for operation of the management computer 500. Control programs and control information that the program memory 4000 holds are described later (see FIG. 7).

<Software Configuration in Disk Storage>

Figure 5:
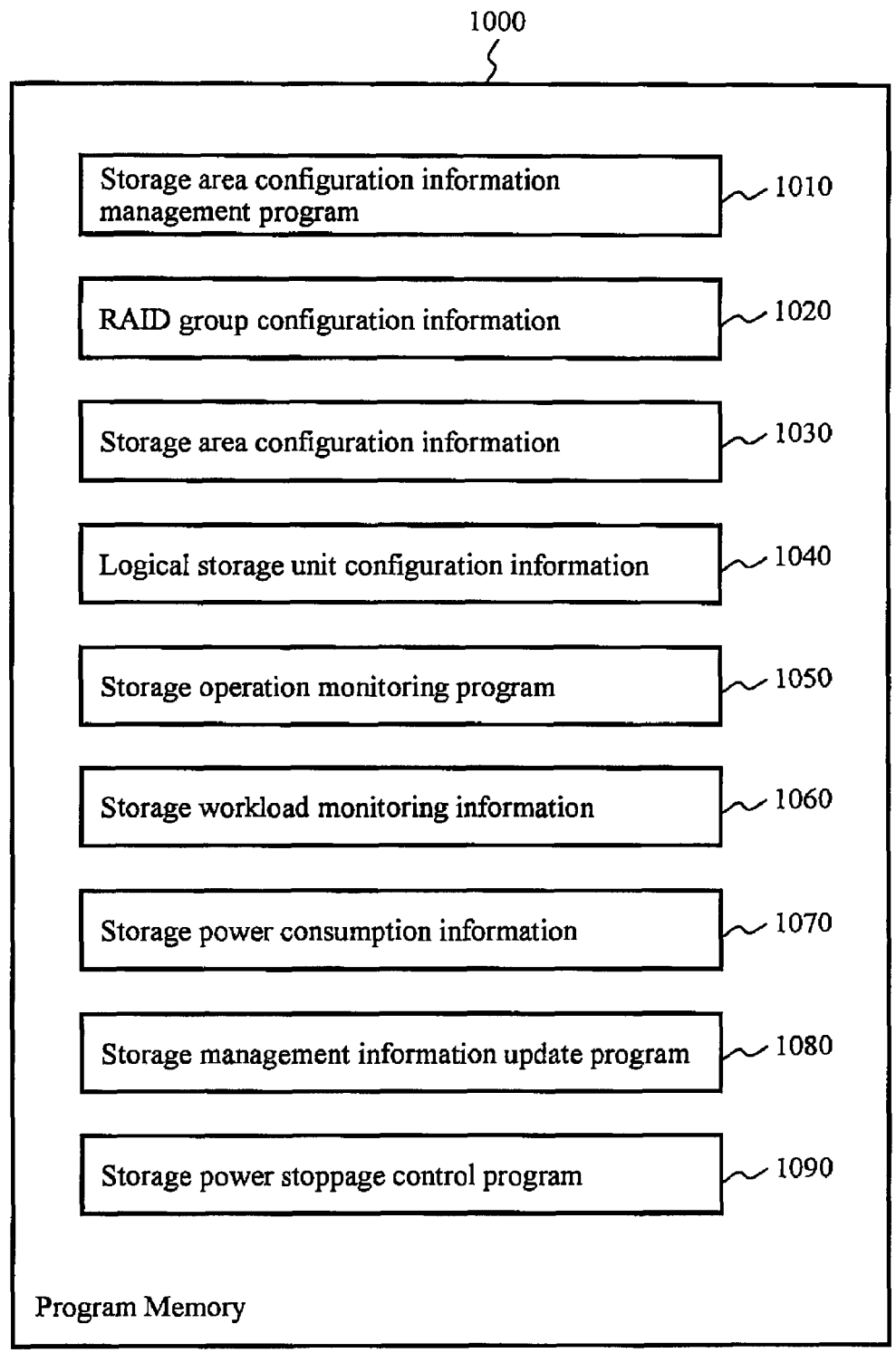
FIG. 5 is a view that illustrates control information and programs (software information) that are stored in a program memory 1000 of the disk storage 100.

FIG. 5 is a view that shows a configuration example (software configuration example) of control programs and control information that the disk storage 100 loads in the program memory 1000.

In FIG. 5, a storage area configuration information management program 1010 is a program for managing storage resources that the disk storage 100 provides to the server 200 based on configuration information that is described later. For example, the storage area configuration management program 1010 executes rewriting of respective types of configuration information with respect to configuration information 1020 to 1040, described later, in accordance with various configurational modifications and the like.

RAID group configuration information 1020 is information that represents a configuration of a RAID group formed by a group of disk drives 130. Storage area configuration information 1030 is information that represents the configuration of a storage area that is a storage resource unit that is obtained by logically dividing a RAID group. Logical storage unit configuration information 1040 is information that represents the configuration of a logical storage unit that is a storage resource unit that is provided to the server 200.

A storage operation monitoring program 1050 is a program that mainly records an operating load such as an I/O processing count and a data transfer amount for each storage area. Storage workload monitoring information 1060 is information that mainly shows a record of operating performance such as an I/O processing count or a data transfer amount for each storage area.

Storage power consumption information 1070 may be a record of power consumption that is measured for each storage area, or may be a record of power consumption that is calculated based on the storage workload monitoring information 1060. In the former case, for example, it is sufficient to provide each disk storage with a powermeter and use a value that is actually measured. A method of calculating a power consumption is described later.

A storage management information update program 1080 is a program that controls communication for outputting the configuration information 1020 to 1040 and the storage workload monitoring information 1060 and the storage power consumption information 1070 possessed by the disk storage 100 to the management computer 400.

A storage power stoppage control program 1090 is a program that controls stopping of the disk drive 130 or the entire disk storage 100 upon receiving an instruction from the management computer 400 or in a period in which no inputs/outputs occur.

<Software Configuration in Server>

Figure 6:
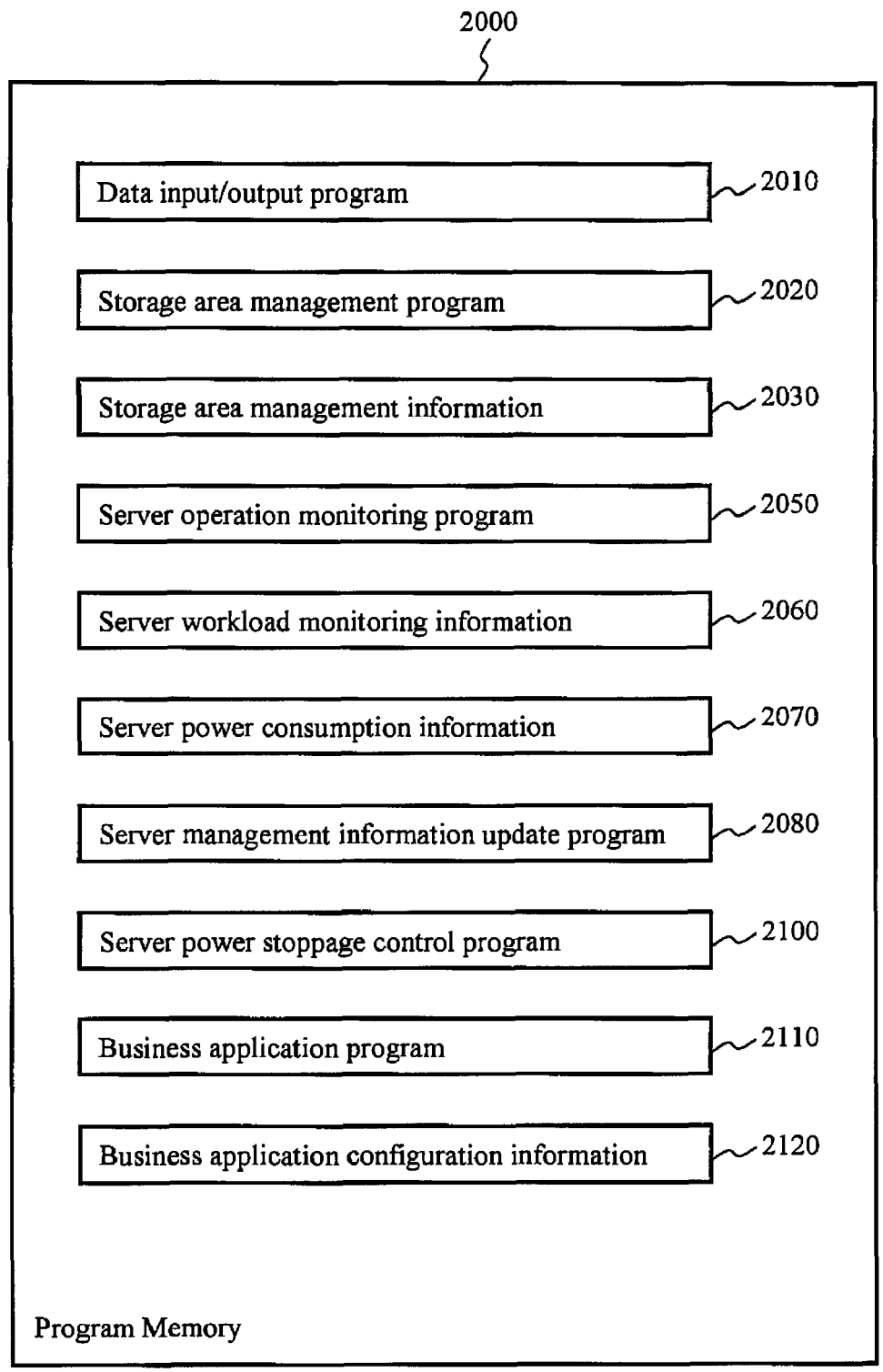
FIG. 6 is a view that illustrates control information and programs (software information) that are stored in a program memory 2000 of the server 200.

FIG. 6 is a view that shows a configuration example (software configuration example) of control programs and control information that the server 200 stores in the program memory 2000.

In FIG. 6, a data input/output program 2010 is a program that performs read/write processing with respect to a logical storage unit that the disk storage 100 provides.

A storage area management program 2020 is a program for allowing the server 200 to manage a storage area based on storage area management information 2030 that is described hereafter.

The storage area management information 2030 is information (mount information) that represents a configuration for associating a logical storage unit that the disk storage 100 provides with a file system that the server 200 operates.

A server storage operation monitoring program 2050 is a program that records an operating load at a server such as a transaction processing count or an email message count for each application. Server workload monitoring information 2060 is information that mainly represents a record of operating performance such as a transaction processing count or an email message count for each application.

Server power consumption information 2070 may be a record of power consumption that is measured for each application, or may be a record of power consumption that is calculated based on the server workload monitoring information 2060. In the latter case, the server power consumption can be calculated by a simple linear function using, for example, the utilization rate of the Processor Unit (CPU) 270 as a variable.

A server management information update program 2080 is a program that controls communication for outputting configuration information and workload monitoring information possessed by the disk storage 100 to the management computer 400.

A server power stoppage control program 2100 is a program that controls stopping of the server 200 or an application upon receiving an instruction from the management computer 400 or the like.

A business application program 2110 is a program that operates an application such as a database or mail server or an accounts system application. According to the present invention, in addition to these applications, a guest OS (virtual server, virtual machine) in a virtual server system can also be handled as a business application.

Business application configuration information 2120 is information for managing an operation state of a business application that runs on the server 200 as well as a storage area that is utilized. This information is managed by each relevant business application.

<Software Configuration in Management Computer>

Figure 7:
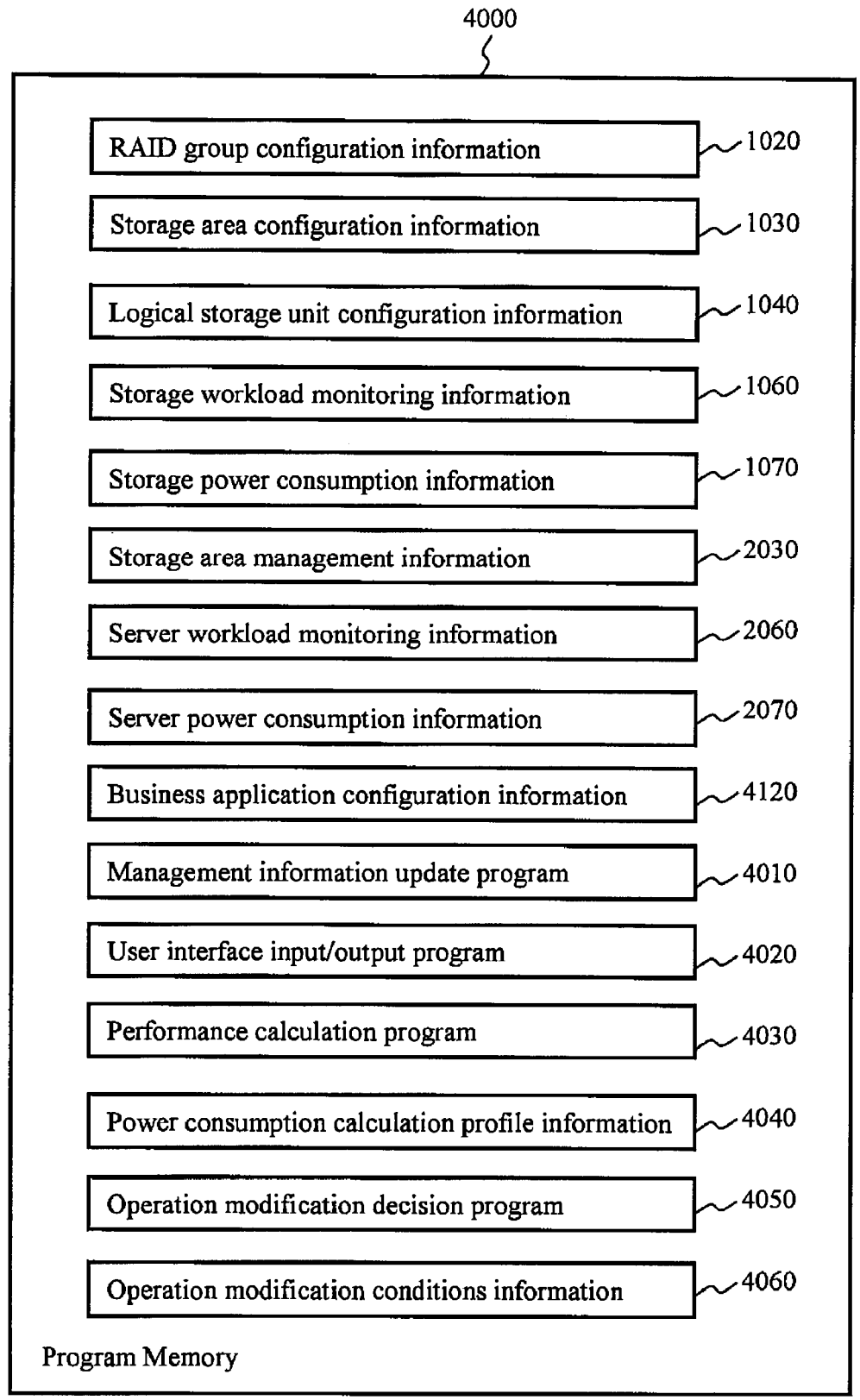
FIG. 7 is a view that illustrates control information and programs (software information) that are stored in a program memory 4000 of the management computer 400.

FIG. 7 is a view that shows a configuration example (software configuration example) of control programs and control information that the management computer 400 stores in the program memory 4000.

In FIG. 7, the RAID group configuration information 1020, the storage area configuration information 1030, the logical storage unit configuration information 1040, the storage workload monitoring information 1060, and the storage power consumption information 1070 are information that correspond to the same information that the management computer 400 acquires from the disk storage 100.

Further, the storage area management information 2030, the server workload monitoring information 2060, the server power consumption information 2070, and the business application configuration information 4120 correspond to the same information that the management computer 400 acquires from the server 200.

A management information update program 4010 is a program for allowing the management computer 400 to communicate with the disk storage 100 and the server 200 to acquire various kinds of configuration information.

A user interface input/output program 4020 is a program that provides an interface for an administrator of the management computer 400 to input and output management information using the input device 480 and the output device 490.

A performance calculation program 4030 is a program for calculating performance for a post-modification configuration when it is attempted to modify a configuration such as by concentrating storage areas in N RAID groups (RG). Power consumption calculation profile information 4040 is a definition of a computation (algorithm, equation) used for determining by calculation the power consumption for a given system configuration.

An operation modification decision program 4050 is a program for deciding operation and/or configuration modifications such as concentration of storage resources and computer resources and stopping a power supply. The operation modification decision program 4050 refers to conditions in operation modification conditions information 4060 to decide whether or not an operation and/or a configuration should be modified.

The operation modification conditions information 4060 includes condition definitions for judging whether to modify an operation or a configuration for each business application.

<RAID Group Configuration Information>

FIG. 8 is a view that illustrates an example of the RAID group configuration information 1020 that the disk storage 100 loads. The RAID group configuration information 1020 is composed by RAID group identification information 10201 and disk drive identification information 10202.

In FIG. 8, a RAID group that is recorded in the RAID group identification information 10201 is composed by a plurality of disk drives 130 that are recorded in the disk drive identification information 10202. The disk drives 130 that constitute a RAID group are units that constitute a RAID (Redundant Array of Independent Disks).

FIG. 8 is a view that shows, for example, that a RAID group (RG) #01 is composed by disk drive (HD) #01 to disk drive (HD) #04, and a RAID group (RG) #02 is composed by disk drive (HD) #11 to disk drive (HD) #14.

<Storage Area Configuration Information>

FIG. 9 is a view that shows an example of the storage area configuration information 1030 that the disk storage 100 loads. The storage area configuration information 1030 is composed by logical storage area identification information 10301, RAID group identification information 10302, and an address range (start block address 10303 and end block address 10304).

In FIG. 9, a storage area recorded in the logical storage area identification information 10301 represents information for identifying a logical storage area that is defined by a RAID group recorded in the RAID group identification information 10302. Further, the address range includes information regarding the start block address 10303 and the end block address 10304, and shows a logical address space of a range that corresponds to the relevant logical storage area in the RAID group in question.

As shown in FIG. 9, for example, a logical storage area (LD: Logical Device) #01 is composed by a region from address 0x0001 to address 0x0100 of the RAID group (RG) #01.

<Logical Storage Unit Configuration Information>

FIG. 10 is a view that shows an example of the logical storage unit configuration information 1040 the disk storage 100 loads. The logical storage unit configuration information 1040 is composed by a world wide port name 10401, a logical unit number 10402, and logical storage area identification information 10403.

In FIG. 10, it is assumed that identification information of the data I/O network interface 110 can be represented with the world wide port name 10401. Further, a logical storage unit is identified with the logical unit number 10402 that is defined for each data I/O network interface 110. Furthermore, a storage area (LD) included in the same logical storage unit (LU) is represented with the logical storage area identification information 10403.

As shown in FIG. 10, for example, an LU#01 and an LU#02 are connected to an interface that is identified by the world wide port name 50:00:00:01:1E:0A:F4:01, and these units are physically composed by an LD#01 and an LD#02, respectively.

<Storage Workload Monitoring Information>

FIG. 11 is a view that shows an example of the storage workload monitoring information 1060 that the disk storage 100 records. The storage workload monitoring information 1060 is information that is obtained by counting I/Os that are processed inside a storage.

The storage workload monitoring information 1060 includes (a plurality of) tables for each RAID group or logical storage area. A table relating to a single RAID group is composed by a time 10601, a busy rate 10602, an IO rate 10603, and a data transfer rate 10604.

In FIG. 11, the time 10601 represents an observation time in an operational state. In this connection, the storage workload monitoring information may be an instantaneous value at the observation time in question or may be a mean value or a maximum value in a sampling interval (15 minutes according to the present example).

The busy rate 10602 shows a disk utilization rate of the relevant RAID group using a percentage. That is, this information shows what degree of time in a sampling interval (for example, 15 minutes) that I/Os were processed for (the degree of time that the storage was busy). The count method is, for example, a method that integrates the I/O processing time with respect to only the number of I/O processing events, and computes what percentage of the sampling interval the obtained integrated value occupies.

The IO rate 10603 is information that, for example, shows an observed value with respect to an I/O processing count per second. Further, the data transfer rate 10604 is information that, for example, shows an observed value with respect to a data transfer time per second.

<Storage Power Consumption Information>

FIG. 12 is a view that illustrates an example of the storage power consumption information 1070 that the disk storage 100 records.

In FIG. 12, the storage power consumption information 1070 includes (a plurality of) tables for each RAID group. A time 10701 is information that represents an observation time in an operational state. A power consumption 10702 is information that represents a power consumption of the relevant RAID group. A method of calculating the power consumption is described later.

<Storage Area Management Information>

FIG. 13 is a view that shows an example of storage area management information 2030 that the server 200 manages. The storage area management information 2030 includes a target world wide port name 20302 and a logical unit number 20303.

In FIG. 13, a mount point 20301 is information that represents a mount point that signifies a logical position that associates a logical storage unit with a file system on an OS that the server 200 runs. The target world wide port name 20302 is information that represents identification information of the data I/O network interface 110 on the disk storage 100 of the logical storage unit associated with the relevant mount point. The logical unit number 20303 is information that represents an identification number of a logical storage unit that is defined by the relevant data I/O network interface 110.

As shown in FIG. 13, for example, it is found that the mount points "/mount/data1" and "/mount/data2" on the server 200 are associated with LU#01 and LU#2, respectively, via an interface identified by 50:00:00:01:1E:0A:F4:01 of the disk storage 100.

<Server Workload Monitoring Information>

FIG. 14 is a view that shows an example of the server workload monitoring information 2060 that the server 200 records. The workload monitoring information 2060 is composed of (a plurality of) tables for each application. Each table includes a time 20601, a CPU busy rate 20602, a transaction count 20603, and an e-mail message count 20604.

The time 20601 is information that represents a sampling time in an operation state. In this connection, the workload monitoring information may be an instantaneous value at the relevant observation time or may be a mean value or a maximum value in a sampling interval (15 minutes according to the present example).

The CPU busy rate 20602 represents a CPU load ratio produced by processing generated at the relevant application as a percentage. That is, this information shows, for example, the degree of time the CPU has been occupied by the relevant application during the sampling interval (15 minutes). The transaction count 20603, for example, is information that represents the transaction processing count per sampling interval. The e-mail message count 20604 is information that, for example, represents the number of sent and received emails per sampling interval.

<Business Application Configuration Information>

FIG. 15 is a view that shows an example of the business application configuration information 2120 that the server 200 manages. The business application configuration information 2120 is composed by a business application instance 21201, a status 21202 and a storage configuration 21203.

In FIG. 15, a business application instance 21201 represents identification information of a business application that runs on the server 200. In this case, the term "business application" may refer to any kind of application such as a database, a mail server, a payment application, or a virtual server. The status 21202 is information that represents an operation state of a business application, and the classifications thereof include, for example, "running", "shutdown", and "sleep (suspend)". The storage configuration 21203 represents a summary of storage areas that the relevant business application utilizes as mount points.

<Business Application Configuration Information in Management Computer>

Figure 16:
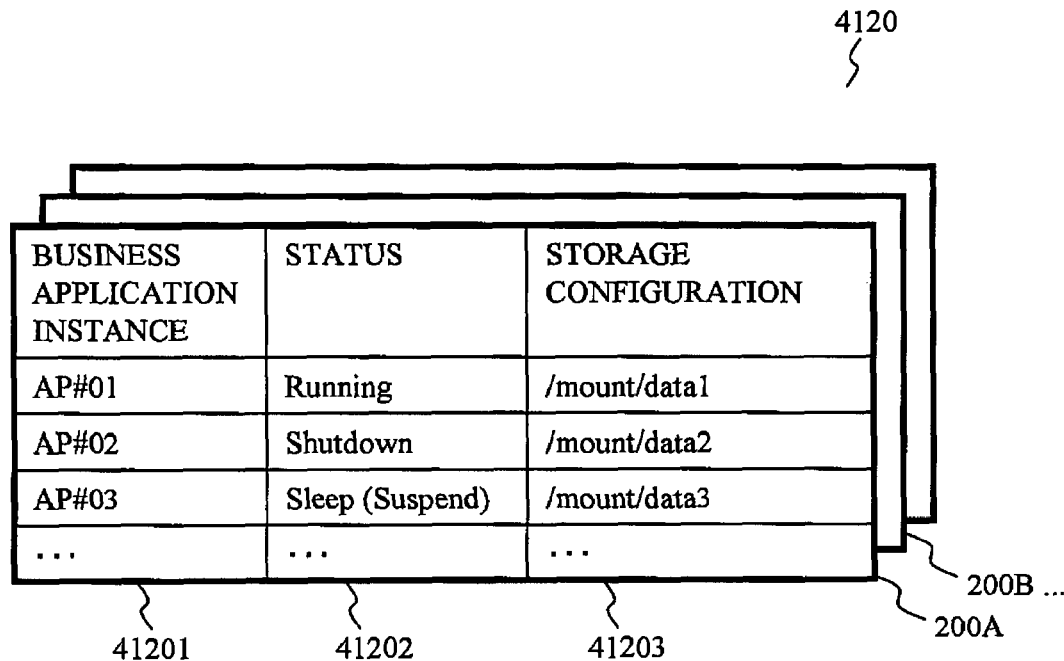
FIG. 16 is a view that illustrates the contents (examples) of business application configuration information 2120 that the management computer 400 acquires from each server 200.

FIG. 16 is a view that shows an example of the business application configuration information 4120 that the management computer 400 collects from the server 200. This information is a set of tables of each server 200. The contents of the information of each table are the same as in FIG. 15.

<Operation Modification Conditions Information>

Figure 17:
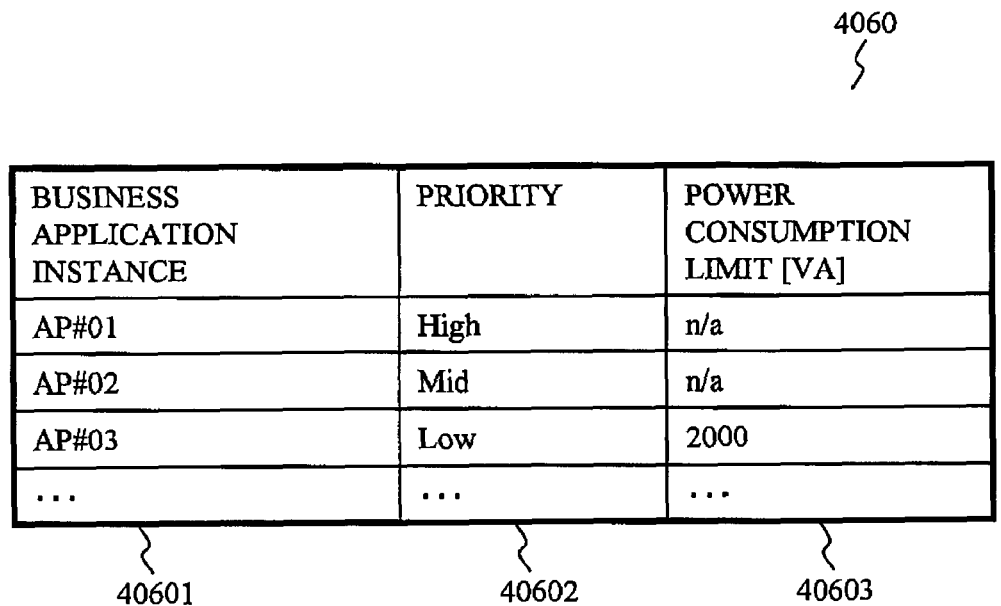
FIG. 17 is a view that illustrates the contents (examples) of operation modification conditions information 4060.

FIG. 17 is a view that shows an example of the operation modification conditions information 4060 that the management computer 400 manages. The operation modification conditions information 4060 is composed by a business application instance 40601, a priority 40602, and a power consumption limit 40603. An administrator can define this information using the input device 480.

In FIG. 17, the business application instance 40601 is identification information of a business application. The priority 40602 is information that shows the priority of applications which it is desired to continue running in a case in which the power supply can no longer match the power demand. The power consumption limit 40603 is information that represents an upper limit of power that the relevant business application can consume. In the example shown in FIG. 17, although an upper limit of power consumption is set only in a case in which the priority is "low", the present invention is not limited thereto.

<Logical System Configuration>

Figure 18:
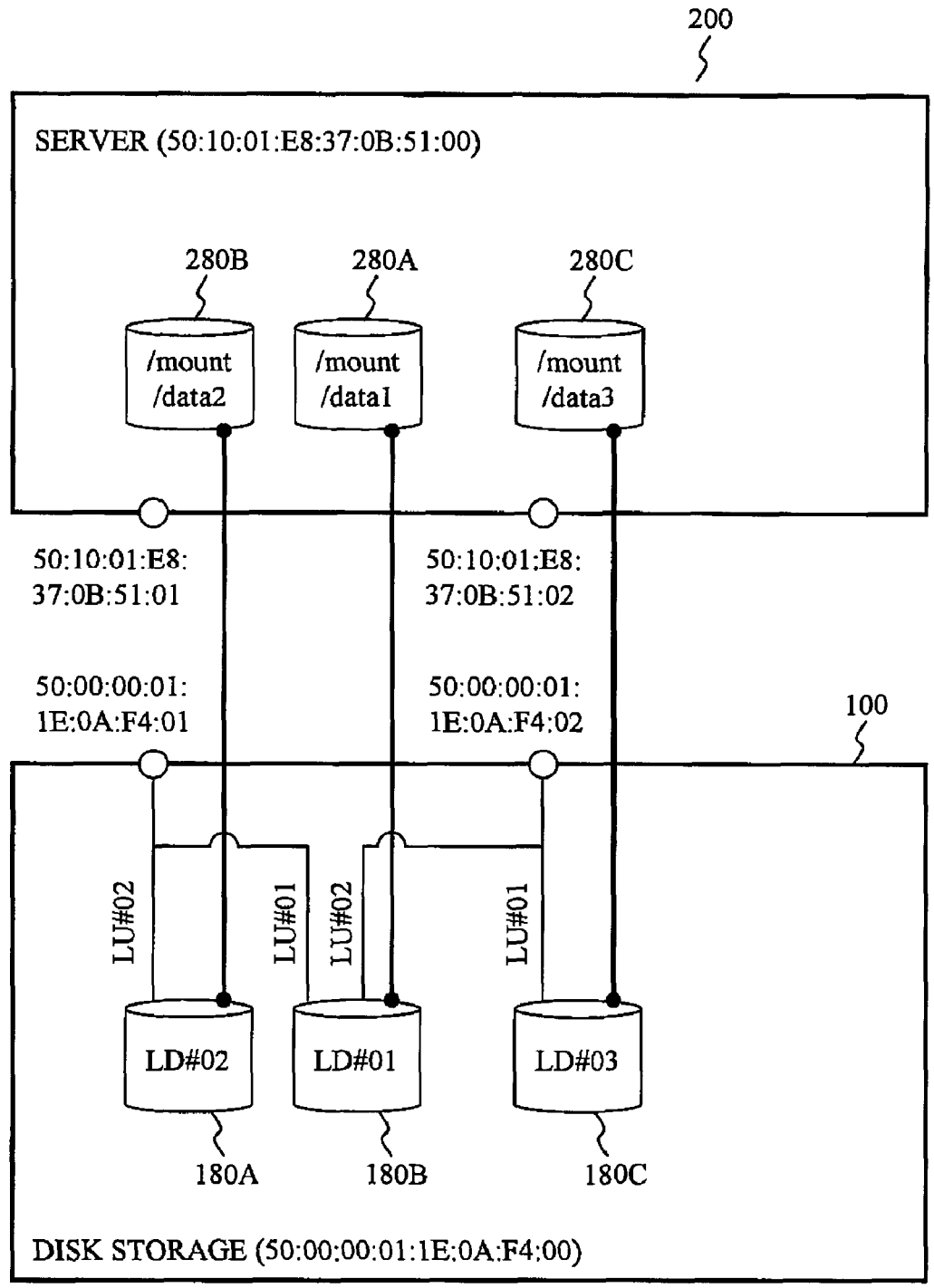
FIG. 18 is a view that logically represents a system configuration example.

FIG. 18 is a view that logically represents a system configuration according to the above configuration information. For example, it is assumed that the server 200 that is identified by a world wide node name "50:10:01:B8:37:0B:51:00" is connected by a network with the disk storage 100 that is identified by a world wide node name "50:00:00:01:1E:0A:F4:00".

In the example shown in FIG. 18, the server 200 has three storage areas 280, and each of these storage areas 280 is associated with a file system at respective mount points. Of these, a storage area 280B that is mounted at "/mount/data2" corresponds to a logical storage unit "LU#02" that is defined in a data I/O network interface 100 identified with "50:00:00:01:1E:0A:F4:01" of the disk storage 100. The logical storage unit LU#02 is composed by a logical storage area "LD#02" 180A. Other storage areas (280A, 280C) are similarly associated with logical storage areas 180B and 180C.

According to the example shown in FIG. 18, the logical storage area LD#01 is seen as LU#02 from a port 50:00:00:01:1E:0A:F4:02, and is seen as LU#01 from the port 50:00:00:01:1E:0A:F4:01. It is therefore possible to operate the disk storage 100 so that the logical configuration is different even when the physical configuration is the same.

<Management Screen (GUI) of Management Computer>

Figure 19:
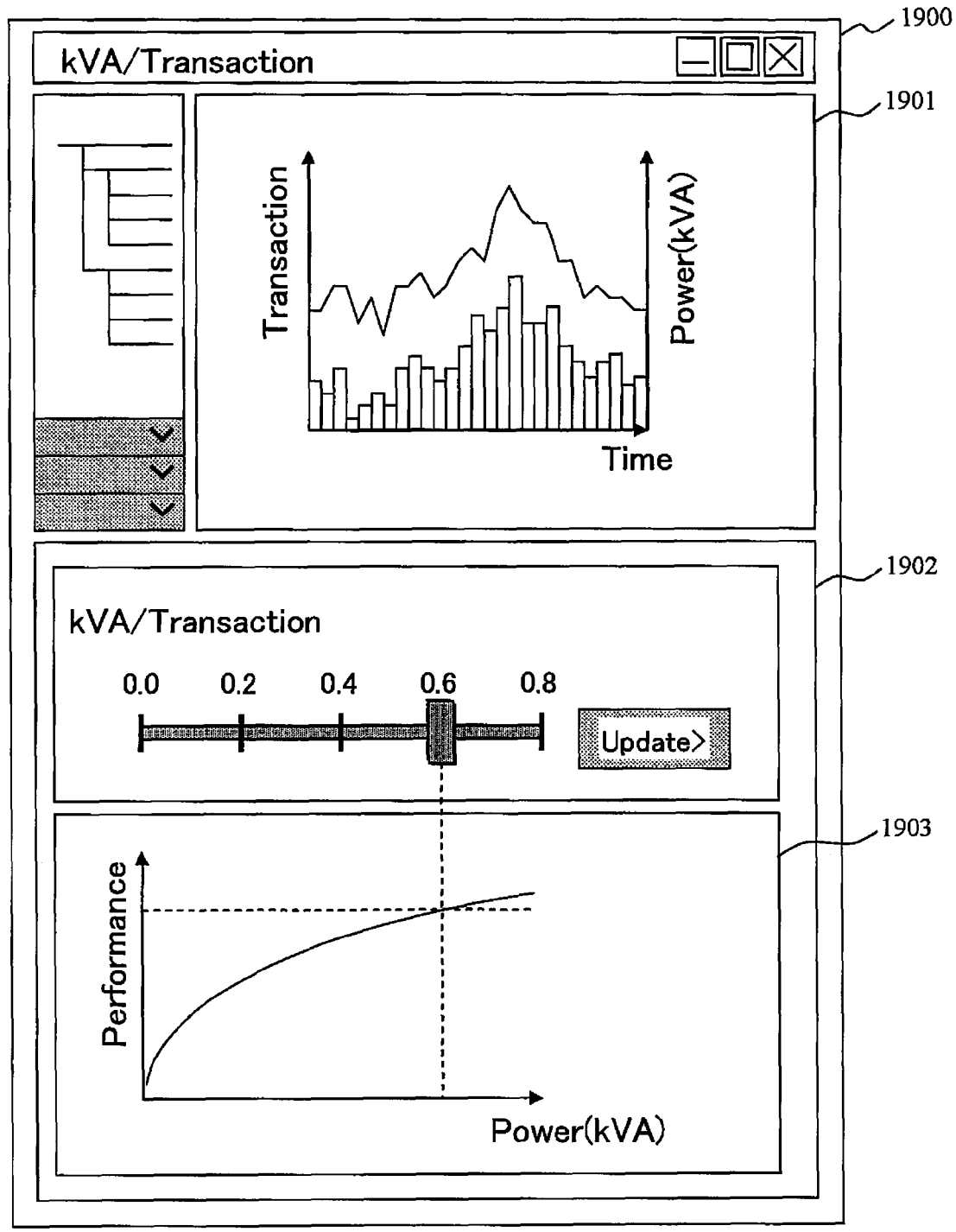
FIG. 19 is a view that illustrates an example of a management screen (GUI) 1900 that the management computer 400 generates and provides using a user interface input/output program 4020.

FIG. 19 is a view that illustrates an example of a management screen (GUI) 1900 that the management computer 400 generates and provides using the user interface input/output program 4020. In this case, an example is illustrated which shows a power consumption (kVA/Transaction) with respect to a transaction count when taking a certain database application as a target.

In FIG. 19, in a power consumption display pane 1901 at the top of the screen, the horizontal axis represents a time axis, the left vertical axis represents a transaction count (line graph) that represents the workload, and the right vertical axis represents the power consumption (bar graph). Information that is calculated at a step S103 (see FIG. 20) described later is displayed as the power consumption information.

Means that inputs a configuration modifying condition (parameter) for reducing the power consumption or raising the performance is provided in a screen center 1902. According to the present example, a power consumption (kVA/Transaction) with respect to a transaction count, that is, a power of a storage that is consumed for processing a single application, is adopted as an adjustment parameter. The adjustment parameter can be modified on the screen, and the configuration of the storage (disk storage 100) is modified (for example, in RG units) according to the parameter value after the modification.

At a screen lower part 1903, a trade off between system performance (vertical axis) and power consumption (horizontal axis) is shown. By referring to the lower part 1903 while performing the parameter adjustment in the screen center 1902, the operator can be assisted with an operation to reduce the power consumption (horizontal axis) in order to satisfy the performance (vertical axis) that is required at that time.

For example, in a case in which the power consumption is displayed as shown in FIG. 19 when the adjustment parameter is 0.6, even if it has been possible to process the maximum transaction count in such case, the administrator may wish to lower the power consumption further. In such a case, the administrator can lower the adjustment parameter as far as, for example, 0.4, to modify the configuration of the storage so as to consume less power.

<Processing for Generating GUI>

Figure 20:
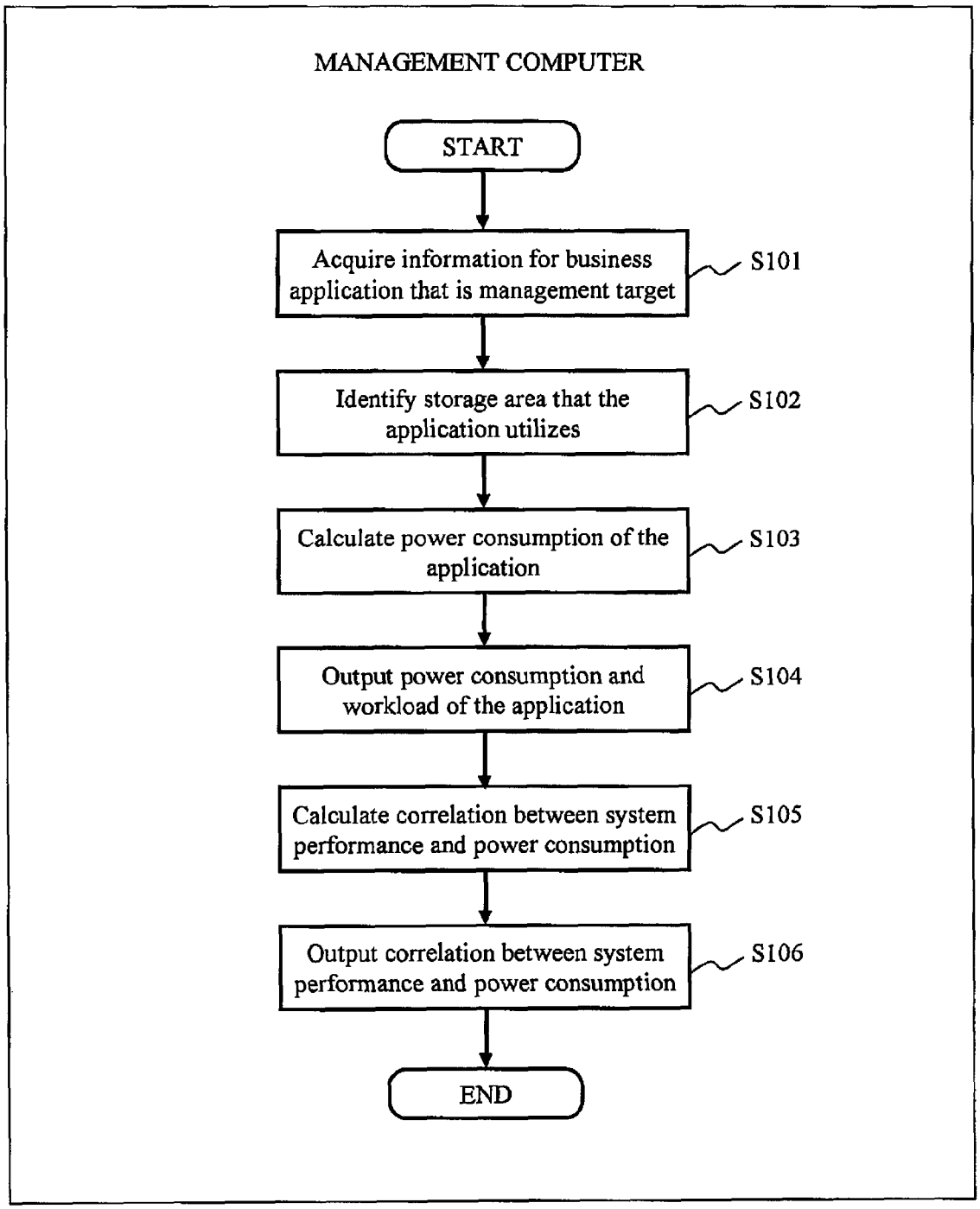
FIG. 20 is a flowchart for describing processing that the management computer 400 executes for outputting the screen shown in FIG. 19.

FIG. 20 is a flowchart for describing processing that the management computer 400 executes for outputting the screen shown in FIG. 19. Unless specified otherwise, the subject of an operation in each step is the processor unit 470 of the management computer 400.

First, the processor unit 470 acquires information regarding a business application that is a management target that is input by the administrator (step S101). At this time it is possible to assist selection of an application by the administrator, for example, by displaying business applications for each server 200 in a tree 1904 on the upper left of the screen shown in FIG. 19. It is sufficient to refer to the business application configuration information 4120 to know the relationship between the servers 200 and business applications.

At the management computer 400, the processor unit 470 refers to the business application configuration information 4120 to identify the storage area 41203 that the relevant application utilizes. The processor unit 470 also refers to the storage area configuration information 2030 to identify a logical storage unit that corresponds to the relevant storage area. The processor unit 470 also refers to the logical storage unit configuration information 1040 to identify the logical storage area 10403 that corresponds to the relevant logical storage unit. Further, the processor unit 470 refers to the logical storage area configuration information 1030 to identify the RAID group 10302 that constitutes the relevant logical storage area (step S102).

Next, the processor unit 470 calculates the sum of power consumption values of all RAID groups that the relevant application utilizes (step S103). A value stored in the storage power consumption information 1070 is used as a power consumption value of a RAID group.

Subsequently, the processor unit 470 outputs (displays) the power consumption and a transaction count representing a workload of the relevant application on the power consumption display pane 1901 on the screen (step S104). It is sufficient to use the server workload monitoring information 2060 (FIG. 14) for the workload, and to use the numerical value calculated in the aforementioned step S103 for the power consumption. In this connection, regarding the workload, the information of any one of the CPU busy rate 20602, the transaction count 20603, and the e-mail message count 20604 in FIG. 14 may be used, or these may be combined (an added value or a weighted added value) and used.

Next, the processor unit 470 calculates a performance and a power consumption for a case that assumes the storage configuration has been modified (step S105). For example, for a configuration in a case in which the number of RAID groups that the relevant application utilizes has been increased or reduced, the total performance that can be exerted is calculated using the performance calculation program 4030, and the power consumption thereof is calculated using the power consumption calculation profile information 4040. Indices that can be considered for evaluating performance include a throughput, TOPS, or response time of each disk apparatus included in the RAID group. For example, when the TOPS is taken as a performance index, a value obtained by adding together the maximum IOPS values that can be exerted by the disk apparatuses included in the RAID group can be taken as the performance. In this connection, a method of calculating the power consumption using profiles is described later.

Subsequently, the processor unit 470 outputs a trade-off curve (or straight line) showing the relation between the thus-calculated power consumption and system performance in the screen lower part 1903 (step S106). More specifically, the processor unit 470 plots on a graph the respective power consumption and system performance for cases in which the number of components of each RAID group are changed, and connects the values with a curve or a straight line to generate the graph shown in the screen lower part shown in FIG. 19. A table that shows the relation between the number of components of a RAID group and the power consumption and system performance is as shown in FIG. 22.

<Storage Configuration Modification Processing>

Figure 21:
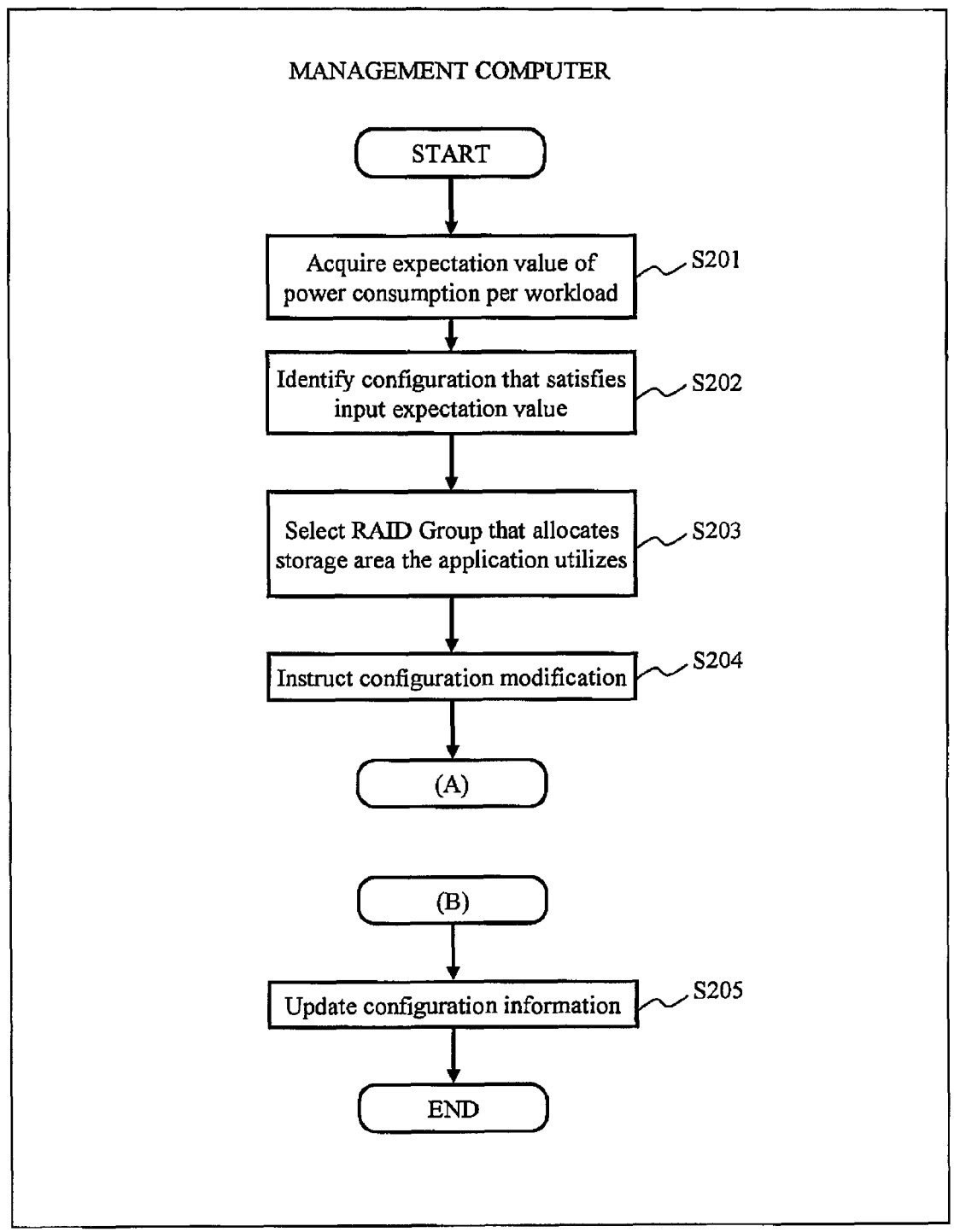
FIG. 21 is a flowchart for describing storage configuration modification processing that the management computer 400 executes.

FIG. 21 is a flowchart for describing storage configuration modification processing that the management computer 400 executes. This processing is performed in accordance with the operation modification decision program 4050, and unless specified otherwise, the subject of an operation in each step is the processor unit 470 of the management computer 400.

First, the processor unit 470 acquires an expectation value for power consumption per workload that the administrator inputs using the parameter adjustment section 1902 in the center of the screen shown in FIG. 19 (step S201).

Next, at the management computer 400, the processor unit 470 identifies a configuration that satisfies the acquired expectation value (step S202). For example, in a case in which the adjustment parameter is modified to 0.4, the processor unit 470 identifies a configuration of a RAID group of storages that corresponds to 0.4. In this connection, since the power consumption per workload is already calculated in the aforementioned step S105, it is sufficient to only select a configuration that corresponds to the expectation value.

Further, the processor unit 470 selects RAID groups that allocate a storage area utilized by the relevant application (step S203). In the case of reducing the number of RAID groups, the processor unit 470 selects RAID groups to be consolidated in a range in which the capacity is sufficient. In a case of increasing the number of RAID groups, the processor unit 470 selects an additional RAID group which has free space.

Subsequently, the processor unit 470 issues an instruction to the disk storage 100 so as to modify the allocation of the storage area in these RAID groups (step S204). In a case in which there is a shortage of consumable power in the overall system at this time, the processor unit 470 may make the number of operating RAID groups zero and stop the relevant application. In other words, in a case in which there is a power shortage in the overall system even when the storage configuration is modified (in a case in which the total amount of power used by the servers 200, each disk storage 100, and each application is greater than a predetermined value), since an effect with respect to controlling the power consumption that is produced just by modifying the storage configuration is small, the processor unit 470 decides to perform processing to stop the application. A configuration may be adopted in which, in addition to stopping an application, the processor unit 470 stops a server that has a large power consumption value.

Next, the processor unit 470 ends the storage configuration update processing, and upon receiving a notification that modification of the configuration in the disk storage 100 is completed, updates each item of configuration information in the program memory 1000 (step S205).

FIG. 22 is a view that shows an example of a result of calculating the system performance and power consumption in the aforementioned step S105. FIG. 22 also shows the configuration of "system performance—power consumption correlation information" that is data for expressing the correlation between system performance and power consumption that is output to the lower part of the screen in FIG. 19 in step S106.

In FIG. 22, a Num of RAID group 22011 is information that represents a total sum of RAID groups included in a storage area that a certain business application uses. A power consumption 22012 is information that represents a power that the RAID groups recorded in the Num of RAID group 22011 consume. This is a value that can be calculated based on a busy rate. The calculation method is described later.

Further, a performance 22013 is information representing the input/output performance of the RAID groups recorded in the Num of RAID group 22011. The input/output performance of a RAID group depends on the number of magnetic storage apparatuses included in the relevant RAID group as well as the RAID level. For example, when the RAID level is RAID 5, the input/output performance is determined by the number of data disks excluding parity disks. In this case, the accuracy can be increased further by adding a computation time taken for parity generation when writing.

<Configuration Modification Processing at Disk Storage>

Figure 23:
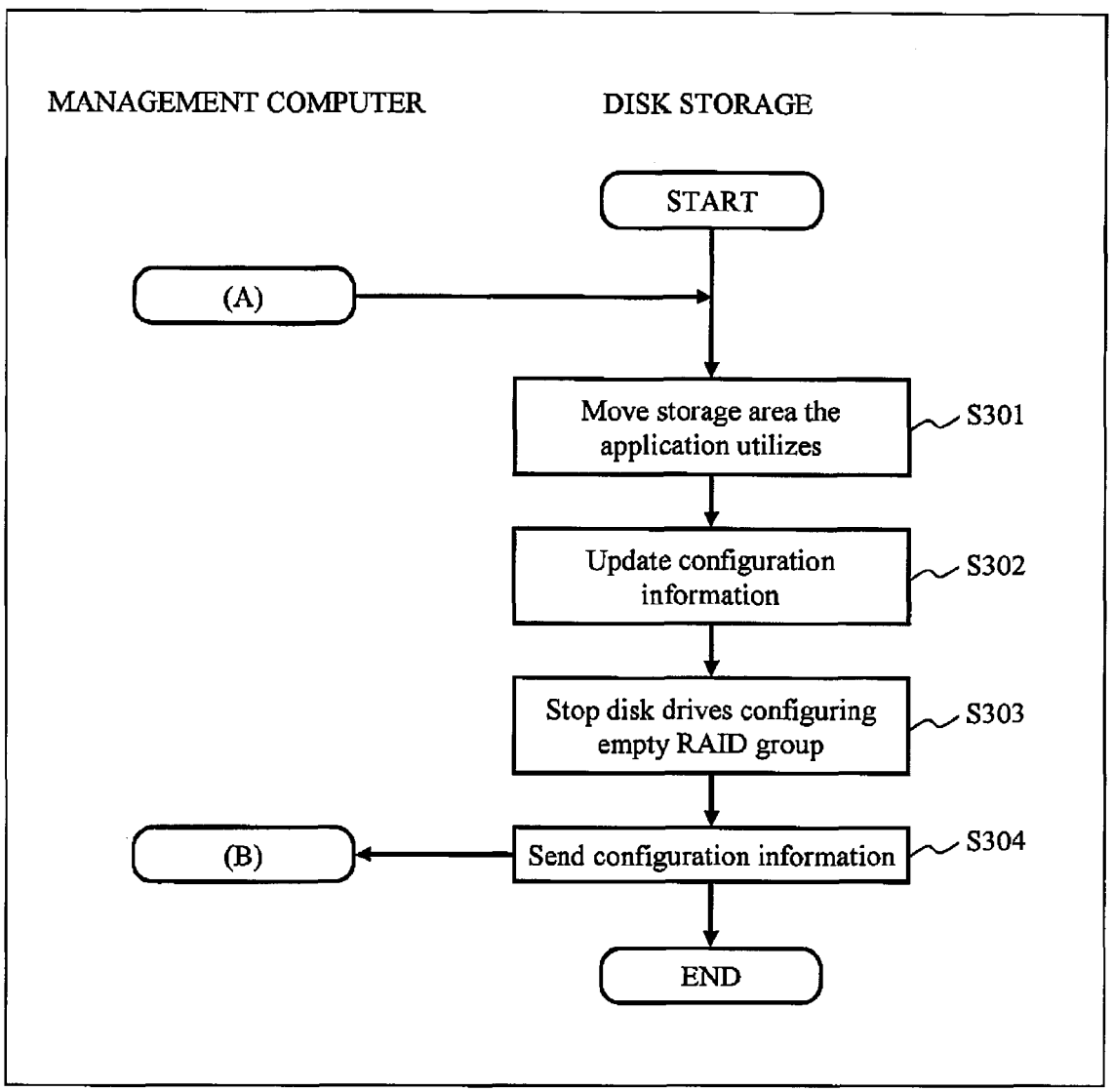
FIG. 23 is a flowchart for describing configuration modification processing that is executed at the disk storage 100 that receives a configuration modification instruction.

FIG. 23 is a flowchart for describing configuration modification processing executed at the disk storage 100 that receives a configuration modification instruction. Unless specified otherwise, the subject of an operation in each step is the storage controller 160 of the disk storage 100.

At the disk storage 100, first the storage controller 160 moves a specified logical storage area 180 to a specified RAID group to concentrate the logical storage area 180 (step S301).

Next, the storage controller 160 updates the configuration information 1020 to 1040 using the storage area configuration information management program 1010 (step S302). The storage controller 160 then uses a power stoppage control program 1100 to stop disk drives 130 that constitute a RAID group that has become empty as the result of concentrating the logical storage area (step S303).

After completing this processing, the storage controller 160 uses the storage management information update program 1080 to send configuration information in which the modified configuration is recorded to the management computer 400 (step S304).

According to the above processing and configuration, it is possible for an administrator to ascertain the system power consumption using application management indices, and to fine tune the configuration while taking into consideration a trade off between performance and power consumption.

<Power Consumption Computation Method>

Computation of the power consumption is performed based on specifications of the electric power of each disk (disk drive 130). Hereunder, the computation method is described in brief.

FIG. 24 is a view that shows an example of a disk power specifications table 32. The disk power specifications table 32 is a table for holding power consumptions in various states for each kind of hard disk included in the storage system, and is updated when a hard disk (disk drive 130) of a new kind is added. This table is referred to when estimating a power with a power estimation function 24.

In FIG. 24, an idling power 322 shows a power consumption when the corresponding hard disk is in an idle state. In this case, the term "idle" refers to a state in which the power is turned on and the hard disk is capable of accepting an access from a disk I/F section, although an access is not made.

A random read time power increment 323 indicates a difference with the idling power in a state in which the corresponding hard disk is in a state of accepting only a random read and is operating to the limit. Here, the term "random read" refers to a state in which the host computer is issuing a read access without any locality with respect to the entire disk. A state in which the hard disk is operating to the limit is a state in which the hard disk is continuously processing disk accesses.

A random write time power increment 324 indicates a difference with the idling power in a state in which the corresponding hard disk is in a state of accepting only a random write and is operating to the limit. Here, the term "random write" refers to a state in which the host computer is issuing a write access without any locality with respect to the entire disk.

A sequential read time power increment 325 indicates a difference with the idling power in a state in which the corresponding hard disk is in a state of accepting only a sequential read and is operating to the limit. Here, the term "sequential read" refers to a state in which the host computer is issuing read accesses in a sequential order to consecutive regions of the hard disk.

A sequential write time power increment 326 indicates a difference with the idling power in a state in which the corresponding hard disk is in a state of accepting only a sequential write and is operating to the limit. Here, the term "sequential write" refers to a state in which the host computer is issuing write accesses in a sequential order to consecutive regions of the hard disk.

FIG. 25 is a view showing one example of a disk operation record table 33. The disk operation record table 33 is a table for recording the degree to which a hard disk is accessed while the storage system is operating, and is updated each time the hard disk is accessed. This table is referred to when the power is estimated with the power estimation function 24.

A disk number 331 shows a position at which a hard disk is mounted. A random read total operating time 332 is a total sum of time in which random read accesses have been issued to the corresponding hard disk. The same applies to a random write total operating time 333, a sequential read total operating time 334, and a sequential write total operating time 335.

FIG. 26 is an example of a tag management table 34. The tag management table 34 records a tag that is an identifier for each access, with respect to accesses being issued to each hard disk. The tag management table 34 is a table for identifying which access request a response is for, even in the case of issuing multiple accesses to a single hard disk. A disk number 341 shows a position (slot number or the like) at which a hard disk is mounted. A tag number 342 is a number that is uniquely assigned to a hard disk 6 that is simultaneously issuing an access, and is a number that is specified at the time of issuing an access. An access classification 343 is the occasion for which the hard disk is accessed.

Figure 27:
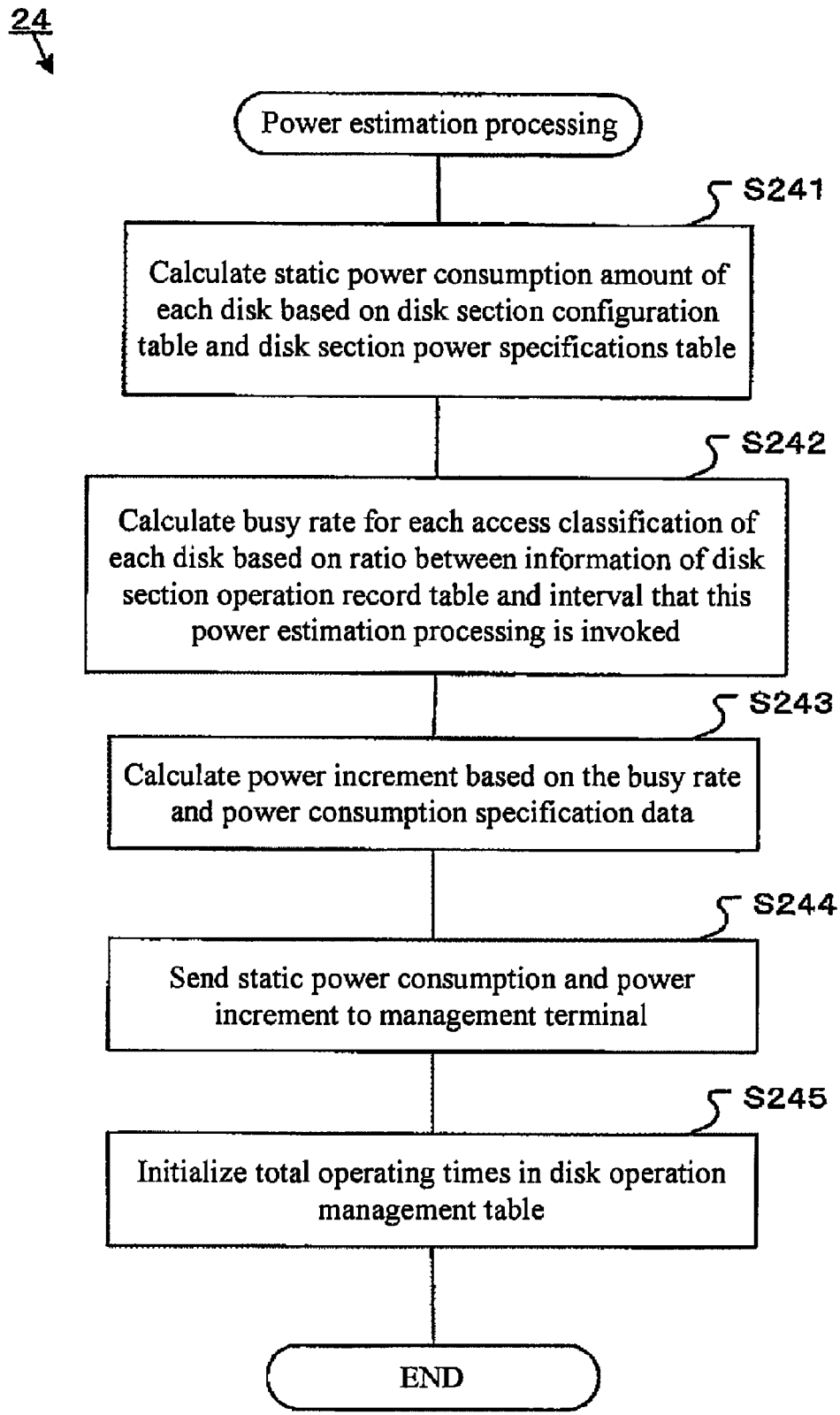
FIG. 27 is a flowchart for describing a power estimation function 24.

FIG. 27 is a view that illustrates an example of the power estimation function 24. The power estimation function 24 is a function that estimates a power that a hard disk of the storage system is consuming based on information in the disk operation record table 33, and sends the estimation result (power consumption value) to the management computer 400.

Hereunder, the processing of the power estimation function 24 is described in order. According to the present function, first a disk section static power consumption is calculated based on the disk power specifications table 32 (S241). More specifically, a static power of each hard disk is determined by acquiring the idling power 322 of the disk power specifications table 32 in correspondence with the disk number.

Next, the power estimation function 24 calculates a busy rate for each access classification of each hard disk based on a ratio between information in the disk operation record table 33 and an interval at which the present power estimation function 24 is invoked (S242). For example, if an interval for invoking the power estimation function 24 is one second and the random read total operating time 332 of the disk operation record table 33 is one millisecond, the random read busy rate is 1/1000.

Next, the power estimation function 24 calculates a power increment of each disk based on the determined busy rate and information in the disk power specifications table 32 (S243). For example, if the busy rate is 1/10 and a power increase in the disk power specifications table 32 is 4.9 W, the power increment is 0.49 W. Subsequently, the power estimation function 24 sends the static power consumption determined in step S241 and the power increment determined in step S243 to the management computer 400 (S244). Finally, the power estimation function 24 initializes to "0" the total operating times 332 to 335 in the disk operation record table 33 (S245).

FIG. 28 is a view that illustrates an example of a method that calculates a disk section power increment which the power estimation function 24 performs in S241 and S243. A static power is determined based on the idling power 322 described in the power specifications table 32, and a power increment for each access classification is determined based on power increments 333 to 336 for each access classification that are similarly described in the power specifications table 32 and a busy rate for each access classification determined in S242 by the power estimation function 24.

(2) Embodiment 2

Unlike the first mode for the invention, a second mode for the invention is not a method in which an administrator inputs a power consumption per workload to adjust the power consumption. Instead, the second mode for the invention relates to processing that automatically modifies a configuration so that the power consumption becomes less than or equal to a threshold value in a case in which the power consumption has exceeded an upper limit threshold value of power consumption per application that is previously defined.

Figure 29:
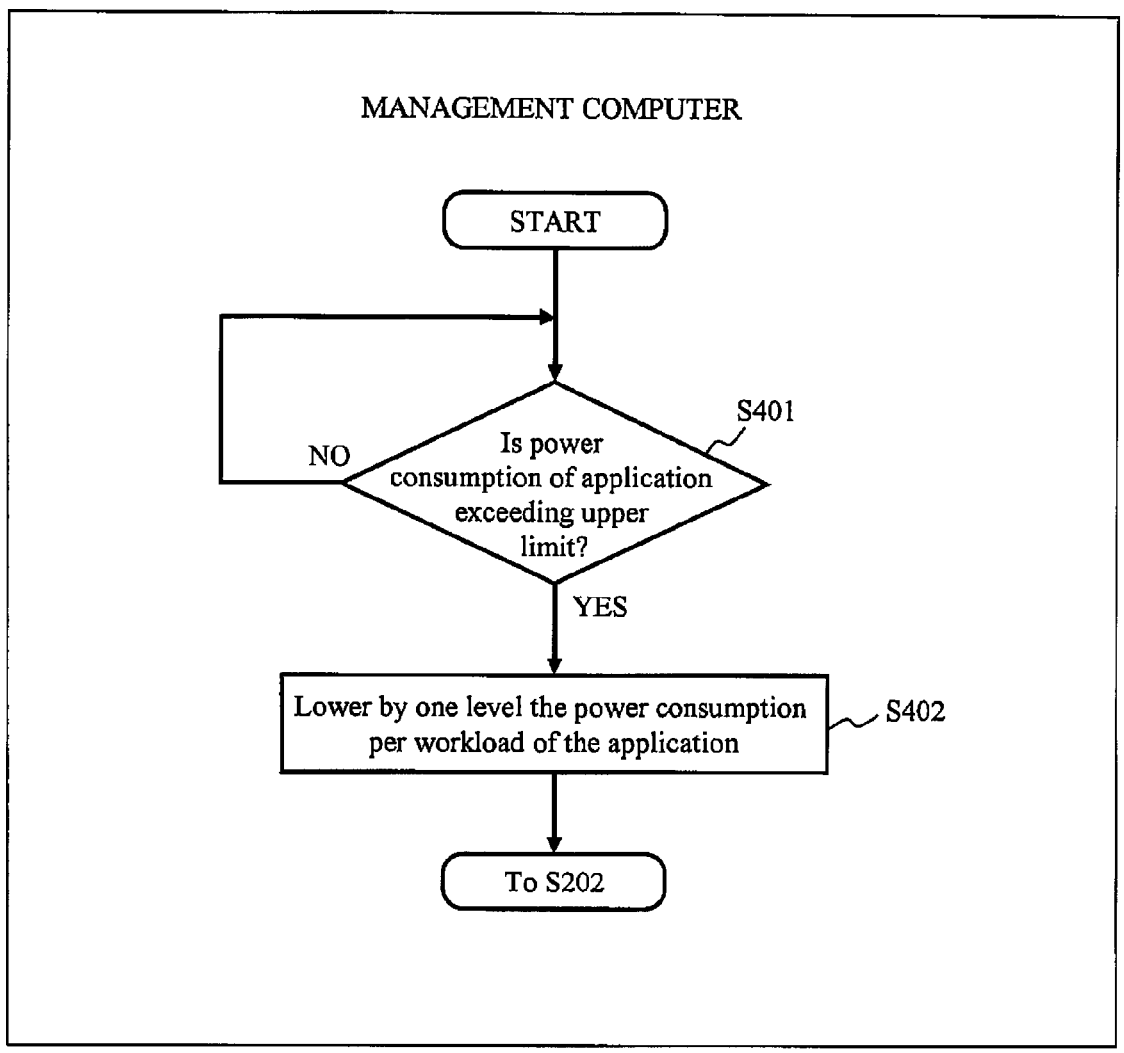
FIG. 29 is a flowchart for describing configuration modification processing according to a second mode for the invention.

FIG. 29 is a flowchart for describing configuration modification processing performed by the management computer 400. Unless specified otherwise, the subject of an operation in each step is the processor unit 470 of the management computer 400.

The processor unit 470 monitors the storage power consumption information 1070 to check whether or not a power consumption upper limit threshold value 40603 per application described in the operation modification conditions information 4060 is being exceeded (step S401). Storage power consumption per application is calculated according to the procedures described in steps S102 and S103. The processor unit 470 determines whether or not that calculated value of storage power consumption exceeds the power consumption upper limit threshold value 40603.

If the sum value of the power consumptions of all the servers exceeds the power consumption upper limit threshold value 40603 (Yes in step S401), the processor unit 470 lowers by one level the power consumption per workload of the relevant application in order to decrease the power consumption of the relevant application. The degree by which the power consumption is lowered may also be a constant such as, for example, 10% of the power consumption per workload or 0.1 VA/Transaction.

After completing this processing, configuration modification processing is performed by shifting to step S203.

(3) Embodiment 3

A third mode for the invention relates to processing that lowers the power consumption in a case in which the power consumption of the overall system or data center has approached an upper limit of a power supply amount.

Figure 30:
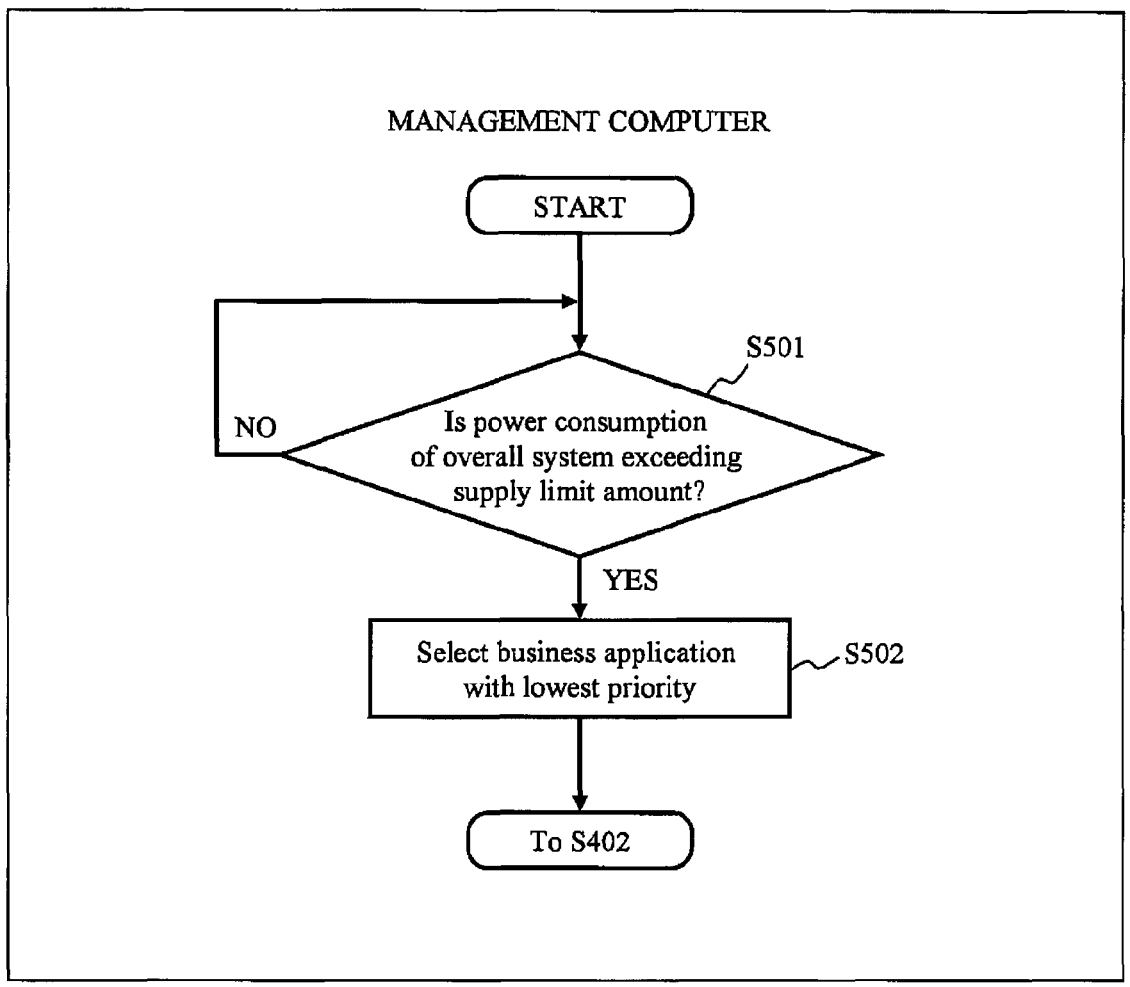
FIG. 30 is a flowchart for describing configuration modification processing according to a third mode for the invention.

FIG. 30 is a flowchart for describing configuration modification processing according to the third mode for the invention. Unless specified otherwise, the subject of an operation in each step is the processor unit 470 of the management computer 400.

In FIG. 29, the processor unit 470 detects whether a limit of a power supply amount from power source equipment or a power source equipment management mechanism is being exceeded, or determines whether or not a power supply limit amount that is previously defined by an administrator is being exceeded (step S501).

When the power consumption of the overall system is exceeding a power supply limit amount (Yes in step S501), the processor unit 470 refers to the priority 40602 of the operation modification conditions information 4060 to select the application with the lowest priority among the applications that are running (step S502).

Thereafter, the processing shifts to step S402. As a result, power consumption reduction processing for the relevant application is performed.

(4) Modification Example

Although processing that takes power consumption management for storages as a target is described according to the above modes for the invention, the power consumption management of the present invention may also be applied to a server or a network connection device, and not just to storages. For example, it is clear that the power consumption of a server per workload can be displayed with an index such as kVA/Transaction. When adjusting the power consumption, a configuration may be adopted such that instead of concentrating storage areas, servers running an application are concentrated and vacant servers are stopped.

(5) Conclusion

According to the modes for the invention, the servers 200A, 200B, . . . manage a transaction count for each application as well as temporal transitions thereof as server workload information 2060. Further, the management computer 400 calculates power that is consumed at the disk storages 100A, 100B, . . . or/and the servers 200A, 200B, . . . in order to execute the application that is the management target. The management computer 400 acquires the transaction count of the application that is the management target from the servers 200A, 200B, . . . , and displays a temporal transition 1901 in the power consumption and transaction count that are calculated for the application that is the management target as a GUI on a display section. As a result, without using a management index such as the number of I/Os (IOPS) or transfer rate with respect to which observation results can not be understood unless the administrator is experienced, it is possible to provide an administrator with a power consumption management tool that uses an index with which an application is easy to manage visually.

The power consumption is calculated as follows. That is, the servers 200A, 200B, . . . manage the application configuration information 2120 that shows storage areas of disk apparatuses (HDD) 130 that each application utilizes. In this case, the management computer 400 acquires application configuration information 2120 from the servers 200A, 200B, . . . and identifies a storage area of a disk apparatus that the application that is the management target utilizes based on the application configuration information 2120. The management computer 400 then calculates the power consumption utilized at the disk storages 100A, 100B, . . . in order to execute the application that is the management target based on power specification information of the disk apparatus 130 that has the identified storage area. Although the power consumption may be measured using a powermeter, by adopting the above configuration it is possible to determine the power consumption of disk storages at low cost and accurately without using a powermeter.

Further, based on a storage performance that can be exerted in a case in which the configuration of a storage area of a disk apparatus that the application that is the management target utilizes is modified and on power specifications of the disk apparatus 130 corresponding to the configuration of the storage area after such a modification, the management computer 400 calculates a power consumption to be used at the disk storages 100A, 100B, . . . by the application that is the management target after such a modification, and displays the trade-off curve 1903 showing the trade off between storage performance and power consumption on the display section. It is thereby possible to allow the administrator to visually understand the relationship regarding a trade off between performance and power consumption that are expected for operation of the application. Hence, the administrator can select an appropriate configuration for storage after taking into consideration the relationship between performance and power consumption.

Furthermore, the management computer 400 displays the parameter adjustment section 1902 for changing an expectation value of power consumption per transaction count for the application that is the management target on the display section as a user interface. Thereby, the administrator can easily change the expectation value.

Further, when the administrator modifies an expectation value for the application that is the management target using the parameter adjustment section 1902, the management computer 400 specifies a configuration (Raid group configuration) of the storage area of the disk apparatuses 130 that satisfies the expectation value after the modification, and instructs the disk storages 100A, 100B, . . . to modify the configuration of the storage area that the application that is the management target utilizes. Meanwhile, based on the instruction to modify the configuration of storage areas, the disk storages 100A, 100B, . . . modify the configuration by moving a storage area that the application that is the management target utilizes among a plurality of disk apparatuses. More specifically, when the expectation value has been modified for the purpose of reducing power consumption, the disk storages 100A, 100B, . . . stop empty disk apparatuses that are no longer used for executing the application that is the management target. Thus, by operating the parameter adjustment section 1902, the administrator can simply execute a change (suppression) in power consumption and easily perform management of power that is consumed for each application.

According to another form of the invention, the management computer 400 monitors whether or not a server power consumption that is calculated for the application that is the management target exceeds a predetermined threshold value. When the management target exceeds the predetermined threshold value, the management computer 400 automatically modifies the expectation value of the power consumption per transaction count by lowering the expectation value by one level, identifies a configuration of storage areas of the disk apparatuses that satisfies the expectation value after the modification, and instructs the disk storages 100A, 100B, . . . to modify the configuration of storage areas that the application that is the management target utilizes. Thereby, since the administrator merely needs to specify the application that is the management target and no longer needs to decide by himself or herself whether or not to adjust the power consumption, management of the power consumption is made even easier.

According to a further form of the invention, the management computer 400 monitors whether or not the power consumption of the storage system overall exceeds a predetermined threshold value. When the predetermined threshold value is exceeded, the management computer 400 selects as a management target the application that has the lowest priority, automatically modifies the expectation value of the power consumption per transaction count by lowering the expectation value by one level with respect to the selected application that is the management target, identifies a configuration of storage areas of the disk apparatuses that satisfies the expectation value after the modification, and instructs the disk storages 100A, 100B, . . . to modify the configuration of storage areas that the application that is the management target utilizes. It is thereby possible to automatically suppress the power consumption of the overall system to a fixed value or less and also allocate more power resources to high priority applications.

It is to be understood that the objects of the present invention may also be accomplished by supplying a system or an apparatus with a storage medium in which a program code of software which realizes the functions of the above described modes for the invention is stored, and causing a computer (or CPU or MPU) of the system or apparatus to read out and execute the program code stored in the storage medium. In this case, the program code itself read from the storage medium realizes the functions of the above described modes for the invention, and hence the program code and the storage medium in which the program code is stored constitutes the present invention. Examples of the storage medium for supplying the program code include a flexible disk, a CD-ROM, a DVD-ROM, a hard disk, an optical disk, a magnetic-optical disk, a CD-R, a magnetic tape, a non-volatile memory card, and a ROM.

Further, it is to be understood that the functions of the above described modes for the invention may be accomplished by causing an OS (operating system) or the like which operates on the computer to perform a part or all of the actual operations based on instructions of the program code. Furthermore, it is to be understood that the functions of the above described modes for the invention may also be accomplished by writing a program code read out from the storage medium into a memory provided on a computer and then causing a CPU or the like of the computer to perform a part or all of the actual operations based on instructions of the program code.

Further, it is to be understood that the functions of the above described modes for the invention may also be accomplished by distributing via a network a program code of software which realizes the functions of the above described modes for the invention, storing the program code in storage means such as a hard disk or memory of a system or apparatus or in a storage medium such as a CD-RW or CD-R, and causing a computer (or CPU or MPU) of the system or apparatus to read out and execute the program code stored in the storage means or storage medium at a time of use.

REFERENCE SIGNS LIST

100: Disk Storage
200: Server
300: Data I/O Network
400: Management Computer
110: Data I/O Network Interface
120: Management Network Interface
130: Disk Drive
140: Cache Memory
160: Storage Controller
1000: Program Memory
210: Data I/O Network Interface
220: Management Network Interface
230: Disk Drive
240: Cache Memory
260: Communication Bus
270: Processor Unit
2000: Program Memory
420: Management Network Interface
430: Disk Drive
440: Cache Memory
460: Communication Bus
470: Processor Unit
480: Input Device
490: Output Device
4000: Program Memory
1010: Storage Area Configuration Information Management Program
1020: RAID Group Configuration Information
1030: Storage Area Configuration Information
1040: Logical Storage Unit Configuration Information
1050: Storage Operation Monitoring Program
1060: Storage Workload Monitoring Information
1070: Storage Power Consumption Information
1080: Storage Management Information Update Program
1090: Storage Power Stoppage Control Program
2010: Data Input/Output Program
2020: Storage Area Management Program
2030: Storage Area Management Information
2050: Server Operation Monitoring Program
2060: Server Workload Monitoring Information
2070: Server Power Consumption Information
2080: Server Management Information Update Program
2100: Server Power Stoppage Control Program
2110: Business Application Program
2120: Business Application Configuration Information
4120: Business Application Configuration Information
4010: Management Information Update Program
4020: User Interface Input/Output Program
4030: Performance Calculation Program
4040: Power Consumption Calculation Profile Information
4050: Operation Modification Decision Program
4060: Operation Modification Conditions Information
10201: RAID GROUP IDENTIFICATION INFORMATION
10202: DISK DRIVE IDENTIFICATION INFORMATION
10301: LOGICAL STORAGE AREA IDENTIFICATION INFORMATION 10302: RAID GROUP IDENTIFICATION INFORMATION
10303: START BLOCK ADDRESS
10304: END BLOCK ADDRESS
10401: WORLD WIDE PORT NAME
10402: LOGICAL UNIT NUMBER (LUN)
10403: LOGICAL STORAGE AREA IDENTIFICATION INFORMATION
10601: TIME
10602: BUSY RATE
10603: IO RATE
10604: DATA TRANSFER RATE
10701: TIME
10702: POWER CONSUMPTION
20301: MOUNT POINT
20302: TARGET WORLD WIDE PORT NAME
20303: LOGICAL UNIT NUMBER (LUN)
20601: TIME
20602: CPU BUSY RATE
20603: TRANSACTION COUNT
20604: E-MAIL MESSAGE COUNT
21201: BUSINESS APPLICATION INSTANCE
21202: STATUS
21203: STORAGE CONFIGURATION
41201: BUSINESS APPLICATION INSTANCE
41202: STATUS
41203: STORAGE CONFIGURATION
40601: BUSINESS APPLICATION INSTANCE
40602: PRIORITY
40603: POWER CONSUMPTION LIMIT
180: Logical Storage Area
280: Storage Area

The invention claimed is:

1. A storage system, comprising:
a storage apparatus in which a plurality of disk apparatuses are mounted and the plurality of disk apparatus comprises a plurality of RAID groups;
a server apparatus configured to run a plurality of applications and perform data input/output processing to and from storage areas of the plurality of disk apparatuses; and
a management computer configured to manage a usage state of the storage apparatus and the server apparatus;
wherein
the storage apparatus is configured to manage power consumption and a temporal transition thereof for each of the plurality of RAID groups;
the server apparatus is configured to manage a transaction count and a temporal transition thereof for each application;
the management computer is configured to manage application configuration information that shows one or more RAID groups used by each of the plurality of applications; and
the management computer is configured to
use the application configuration information to identify the one or more RAID groups used by an application utilized by a management target among the plurality of applications,
calculate an electric power that is consumed (power consumption) in the one or more RAID groups in order to execute an application that is a management target based on the power consumption for the each of the plurality of RAID groups obtained from the storage apparatus;
acquire a transaction count of the application that is the management target from the server apparatus; and
display a temporal transition in the calculated power consumption and the transaction count for the application that is the management target on a display section.

2. The storage system according to claim 1, wherein:
the management computer is connected through a network to a plurality of the storage apparatuses and a plurality of the server apparatuses;
a storage area utilized respectively by the plurality of applications is provided in each of the plurality of RAID groups;
the server apparatuses are configured to manage application configuration information that shows the storage area used by the plurality of applications;
the management computer is configured to acquire the application configuration information from the server apparatuses, identify the storage area utilized by the application that is the management target based on the application configuration information, and calculate an electric power that is consumed at the storage apparatuses in order to execute the application that is the management target based on power specification information of each of the disk apparatuses comprising the one or more RAID groups that have the identified storage area;
the management computer is configured to calculate a storage performance that can be exerted in a case in which a configuration of a storage area utilized by the application that is the management target is modified, and an electric power that is consumed at the storage apparatuses after the modification by the application that is the management target based on power specifications of each of the disk apparatuses comprising the one or more RAID groups corresponding to a configuration of the storage area after the modification, and display a tradeoff curve between the storage performance and the power consumption on the display section;
the management computer is configured to display as a user interface on the display section a parameter adjustment section for modifying an expectation value of the power consumption per the transaction count for the application that is the management target;
the management computer is configured to accept a modification of the expectation value by the parameter adjustment section for the application that is the management target, identify a configuration of a storage area that satisfies an expectation value after the modification, and instruct the storage apparatuses to modify a configuration of a storage area utilized by the application that is the management target; and
based on the instruction to modify the configuration of the storage area, the storage apparatuses are configured to modify the configuration by moving a storage area utilized by the application that is the management target among a plurality of disk apparatuses, and, in a case in which the expectation value is modified for a purpose of reducing a power consumption, stop an empty disk apparatus that is no longer used for executing the application that is the management target.

3. The storage system according to claim1, wherein
the storage apparatus are configured to calculate power consumption of each of the plurality of RAID groups based on each respective power specification information of each of the plurality of disk apparatuses comprising each of the plurality of RAID groups.

4. The storage system according to claim 3,
wherein the management computer is configured to calculate a storage performance that can be exerted in a case in which a configuration of a storage area of the disk apparatus utilized by the application that is the management target is modified, and an electric power that is consumed at the storage apparatus after the modification by the application that is the management target based on power specifications of each of the plurality of disk apparatuses comprising the one or more RAID groups corresponding to a configuration of the storage area after the modification, and display a trade-off curve between the storage performance and the power consumption on the display section.

5. The storage system according to claim 4,
wherein the management computer configured to display as a user interface on the display section a parameter adjustment section for modifying an expectation value of the power consumption per the transaction count for the application that is the management target.

6. The storage system according to claim 5,
wherein the management computer is configured to accept a modification of the expectation value by the parameter adjustment section for the application that is the management target, identify a configuration of a storage area that satisfies an expectation value after the modification, and instruct the storage apparatus to modify a configuration of a storage area utilized by the application that is the management target.

7. The storage system according to claim 6,
wherein based on the instruction to modify a configuration of the storage area, the storage apparatus is configured to modify the configuration by moving a storage area utilized by the application that is the management target among a plurality of disk apparatuses.

8. The storage system according to claim 7,
wherein, in a case in which the expectation value is modified for a purpose of reducing a power consumption, the storage apparatus is configured to stop an empty disk apparatus that is no longer used for executing the application that is the management target.

9. The storage system according to claim 1, wherein
the management computer is configured to display as a user interface on the display section a parameter adjustment section for modifying an expectation value of the power consumption per the transaction count for the application that is the management target; and
in a case in which a power consumption that is calculated for the application that is the management target exceeds a predetermined threshold value, the management computer is automatically configured to modify an expectation value of the power consumption per the transaction count to lower the expectation value by one level, identify a configuration of a storage area that satisfies an expectation value after the modification, and instruct the storage apparatus to modify a configuration of a storage area utilized by the application that is the management target.

10. The storage system according to claim 5,
wherein in a case in which a power consumption of the storage system overall exceeds a predetermined threshold value, the management computer configured to select a lowest priority application as a management target, automatically perform a modification to lower by one level an expectation value of the power consumption per the transaction count with respect to the application that is the management target that is selected, identify a configuration of a storage area that satisfies an expectation value after the modification, and instruct the storage apparatus to modify a configuration of a storage area utilized by the application that is the management target.

11. A control method of a storage system,
the storage system comprising a storage apparatus in which a plurality of disk apparatuses is mounted and the plurality of disk apparatuses comprise a plurality of RAID groups,
a server apparatus configured to run a plurality of applications and perform data input/output processing to and from storage areas of the plurality of disk apparatuses; and
a management computer configured to manage a usage state of the storage apparatus and the server apparatus; and
the control method comprising the steps of:
via at least the storage apparatus, managing power consumption and a temporal transition thereof for each RAID group;
via the server apparatus, managing a transaction count and a temporal transition thereof for each application;
via at least the management computer, managing application configuration information that shows one or more RAID groups used by each of the plurality of applications;
via at least the management computer, using the application configuration information to identify the one or more RAID groups used by an application that is a management target among the plurality of applications;
via at least the management computer, calculating a power that is consumed (power consumption) at the storage apparatus in order to execute an application that is a management target based on the power consumption for each of the RAID groups obtained from the storage apparatus;
via at least the management computer, acquiring a transaction count of the application that is the management target from the server apparatus, and
via at least the management computer, displaying on a display section a temporal transition in the power consumption that is calculated and the transaction count for the application that is the management target.

12. The control method according to claim 11, wherein:
the management computer is connected to a plurality of storage apparatuses and a plurality of server apparatuses via a network; and
storage areas utilized by the applications respectively are provided in each of the plurality of RAID groups;
the control method further comprising the steps of:
via at least the server apparatuses, managing application configuration information that shows a storage area of the disk apparatus that the plurality of applications utilize;
via at least the management computer, acquiring the application configuration information from the server apparatuses, identifying the storage area utilized by the application that is the management target based on the application configuration information, and calculating an electric power (power consumption) that is consumed at the storage apparatuses in order to execute the application that is the management target based on power specification information of each of the plurality of disk apparatuses comprising the one or more RAID groups that have the identified storage area;

via at least the management computer, calculating a storage performance that can be exerted in a case in which a configuration of a storage area utilized by the application that is the management target is modified, and an electric power that is consumed at the storage apparatuses after the modification by the application that is the management target based on power specifications of each of the plurality of disk apparatuses comprising the one or more RAID groups corresponding to a configuration of the storage area after the modification, and displaying a trade-off curve between the storage performance and the power consumption on the display section;

via at least the management computer, displaying as a user interface on the display section a parameter adjustment section for modifying an expectation value of the power consumption per the transaction count for the application that is the management target;

via at least the management computer, accepting a modification of the expectation value by the parameter adjustment section for the application that is the management target, identifying a configuration of a storage area that satisfies an expectation value after the modification, and instructs the storage apparatuses to modify a configuration of a storage area utilized by the application that is the management target; and via at least the storage apparatuses, based on the instruction to modify the configuration of the storage area, modifying the configuration by moving a storage area utilized by the application that is the management target among a plurality of disk apparatuses and, in a case in which the expectation value is modified for a purpose of reducing a power consumption, stopping an empty disk apparatus that is no longer used for executing the application that is the management target.

\* \* \* \* \*